United States Patent
Erickson et al.

(10) Patent No.: US 11,567,679 B2
(45) Date of Patent: Jan. 31, 2023

(54) CONCURRENT REMOTE-LOCAL ALLOCATION OPERATIONS

(71) Applicant: Rambus Inc., San Jose, CA (US)

(72) Inventors: Evan Lawrence Erickson, Chapel Hill, NC (US); Christopher Haywood, Cary, NC (US)

(73) Assignee: Rambus Inc., San Jose, CA (US)

(*) Notice: Subject to any disclaimer, the term of this patent is extended or adjusted under 35 U.S.C. 154(b) by 76 days.

(21) Appl. No.: 17/333,409

(22) Filed: May 28, 2021

(65) Prior Publication Data

US 2021/0389887 A1 Dec. 16, 2021

Related U.S. Application Data

(60) Provisional application No. 63/039,081, filed on Jun. 15, 2020.

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0683* (2013.01)

(58) Field of Classification Search
CPC ............. G06F 3/06; G06F 12/02–0246; G06F 12/0815–0853; G06F 12/0862–0873
See application file for complete search history.

(56) References Cited

U.S. PATENT DOCUMENTS

| 7,103,640 | B1 | 9/2006 | Overton et al. |
| 7,233,978 | B2 | 6/2007 | Overton et al. |
| 7,814,170 | B2 | 10/2010 | Overton et al. |
| 9,575,889 | B2 | 2/2017 | Chang et al. |
| 9,626,108 | B2 | 4/2017 | Stabrawa et al. |
| 9,836,217 | B2 | 12/2017 | Stabrawa et al. |
| 2014/0075060 | A1* | 3/2014 | Sharp ........................ G06F 5/14 710/57 |

(Continued)

OTHER PUBLICATIONS

I. Koutras, A. Bartzas and D. Soudris, "Adaptive dynamic memory allocators by estimating application workloads," 2012 International Conference on Embedded Computer Systems (SAMOS), 2012, pp. 252-259, doi: 10.1109/SAMOS.2012.6404182. (Year: 2012).*

(Continued)

*Primary Examiner* — Khoa D Doan
(74) *Attorney, Agent, or Firm* — The Neudeck Law Firm, LLC

(57) ABSTRACT

A memory allocation device on an originating node requests an allocation of memory from a remote node. In response, the memory allocation device on the remote node returns a global system address that can be used to access the remote allocation from the originating node. Concurrent with the memory allocation device assigning (associating) a local (to its node) physical address to be used to access the remote allocation, the remote node allocates local physical memory to fulfill the remote allocation request. In this manner, the remote node has already completed the overhead operations associated with the remote allocation requested by the time the remote allocation is accessed by the originating node.

20 Claims, 19 Drawing Sheets

(56) References Cited

U.S. PATENT DOCUMENTS

2020/0371700 A1* 11/2020 Stabrawa .............. G06F 3/0631

OTHER PUBLICATIONS

GenZ, "Gen-Z Address Translation and Page Services", Apr. 2013, Downloaded from: https://genzconsortium.org/wp-content/uploads/2019/04/Gen-Z-Address-Translation-and-Page-Services-2019.pdf; Downloaded on Apr. 17, 2020. 15 Pages.

Pinto, Christian et al., "Teleporting Memory Across Two Servers", IBM Research Blog, IBM Research Europe, Aug. 2020, https://www.ibm.com/blogs/research/2020/08/teleporting-memory-across-two-servers/, 11 pages.

* cited by examiner

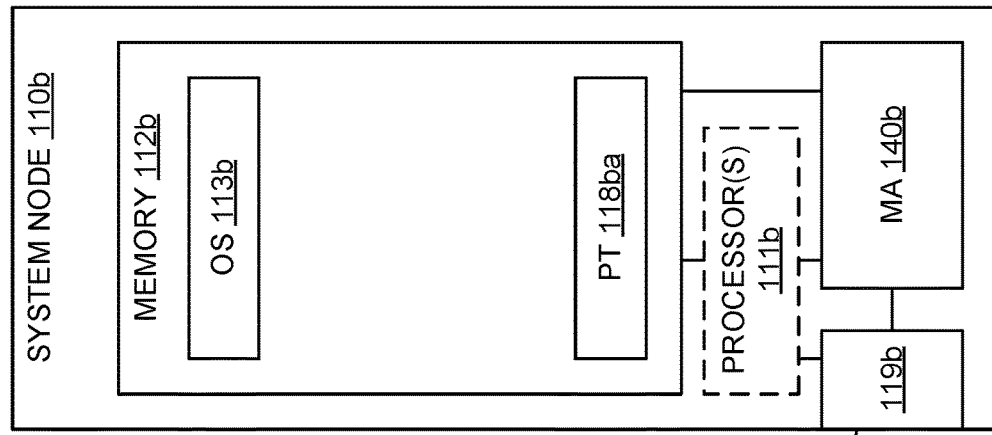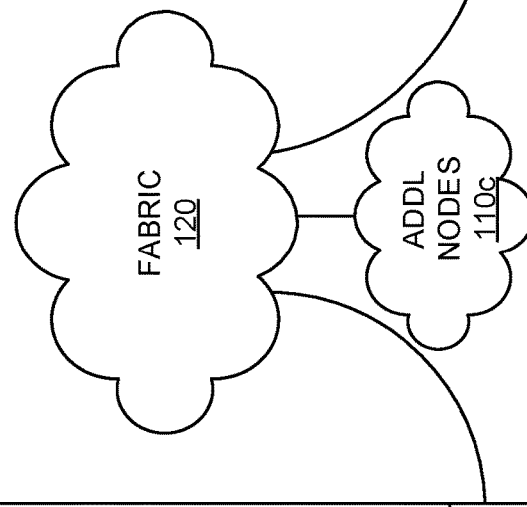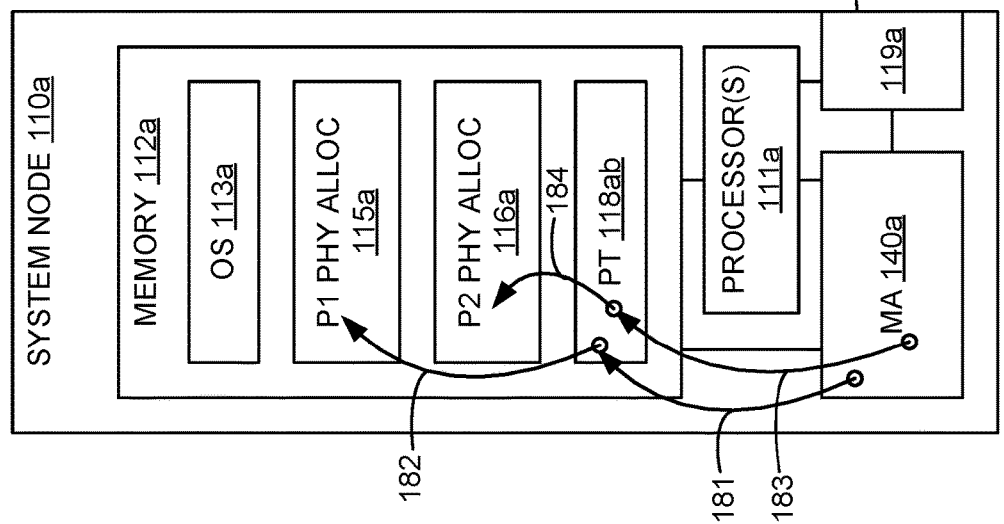
FIG. 1B

```
┌─────────────────────────────────────────────────────────┐
│ RECEIVE, VIA A FIRST INTERFACE AND FROM A FIRST PROCESSOR│
│   THAT IS LOCAL WITH RESPECT TO A FIRST MEMORY ALLOCATION│
│  DEVICE, A FIRST REQUEST, THE FIRST REQUEST TO BE FULFILLED BY│
│   ONE OF A FIRST ALLOCATION OF MEMORY THAT IS LOCAL WITH │
│ RESPECT TO THE FIRST PROCESSOR AND A SECOND ALLOCATION OF│
│    MEMORY THAT IS NOT LOCAL WITH RESPECT TO THE FIRST    │
│                        PROCESSOR                         │
│                           502                            │
└─────────────────────────────────────────────────────────┘
                              │
                              ▼
         ┌────────────────────────────────────────┐
         │  TRANSMIT, VIA A SECOND INTERFACE AND TO A │
         │  SECOND MEMORY ALLOCATION DEVICE THAT IS │
         │     NOT LOCAL WITH RESPECT TO THE FIRST  │
         │  PROCESSOR, A SECOND REQUEST, THE SECOND │
         │   REQUEST BEING FOR A SECOND ALLOCATION OF│
         │   MEMORY THAT IS LOCAL WITH RESPECT TO THE│
         │      SECOND MEMORY ALLOCATION DEVICE     │
         │                   504                    │
         └────────────────────────────────────────┘
                              │
                              ▼
         ┌────────────────────────────────────────┐
         │ RECEIVE, VIA THE SECOND INTERFACE AND FROM│
         │  THE SECOND MEMORY ALLOCATION DEVICE, A  │
         │   SYSTEM ADDRESS TO BE USED TO ACCESS THE│
         │       SECOND ALLOCATION OF MEMORY        │
         │                   506                    │
         └────────────────────────────────────────┘
                              │
                              ▼
         ┌────────────────────────────────────────┐
         │  ASSOCIATE THE SYSTEM ADDRESS WITH A FIRST│
         │       PHYSICAL ADDRESS THAT IS LOCAL WITH│
         │         RESPECT TO THE FIRST PROCESSOR   │
         │       CONCURRENTLY WITH THE SECOND MEMORY│
         │  ALLOCATION DEVICE ALLOCATING A FIRST BLOCK│
         │   OF MEMORY CORRESPONDING TO THE SECOND  │
         │            ALLOCATION OF MEMORY          │
         │                   508                    │
         └────────────────────────────────────────┘
```

*FIG. 5*

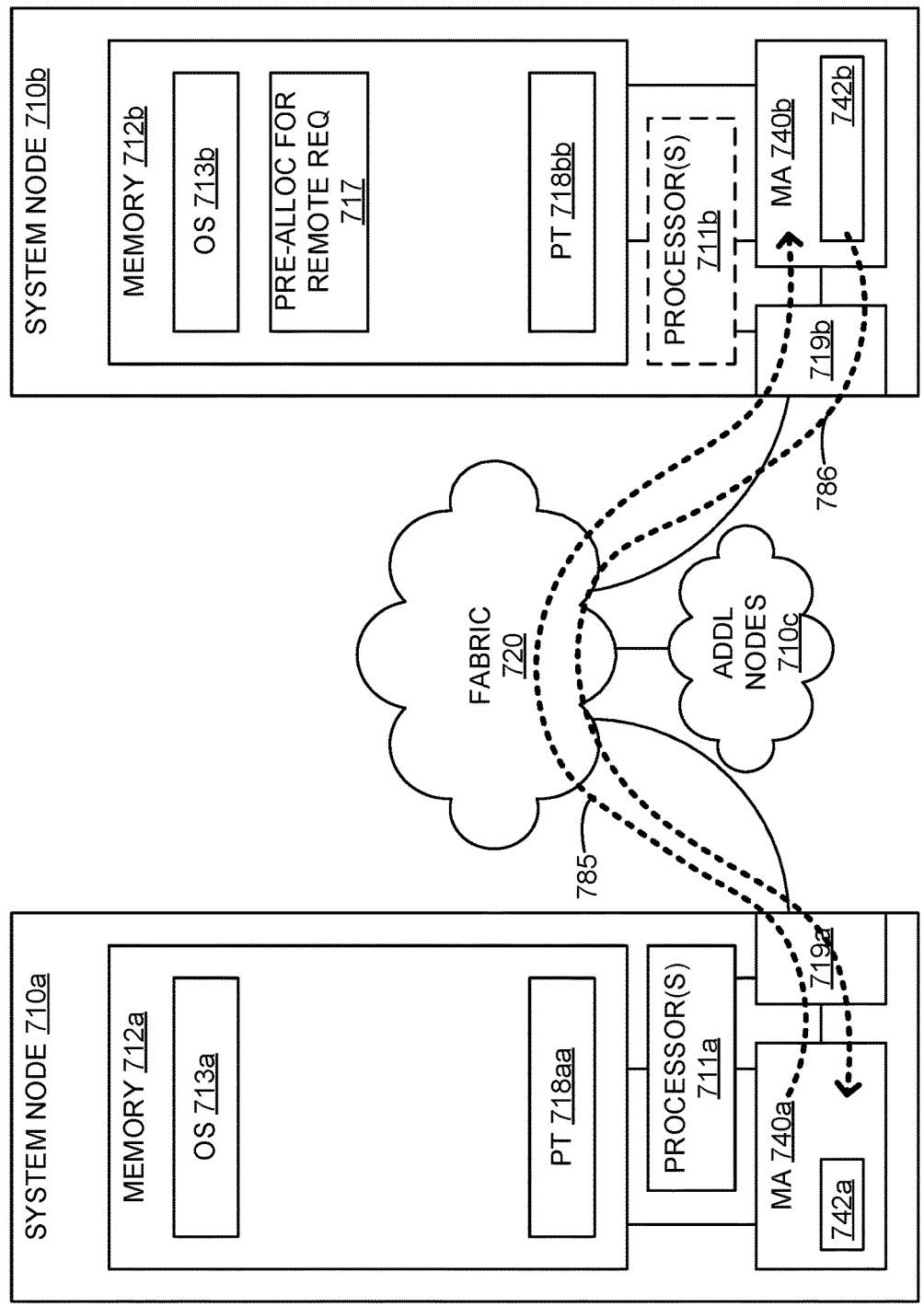

CONCURRENT REMOTE-LOCAL ALLOCATION OPERATIONS

BRIEF DESCRIPTION OF THE DRAWINGS

FIGS. 1A-1E are a block diagrams illustrating a fabric interconnected processing system.

FIG. 5 is a flowchart illustrating a method of allocating memory.

FIGS. 7A-7D are a block diagrams illustrating a fabric interconnected processing system.

DETAILED DESCRIPTION OF THE EMBODIMENTS

Many modern computing systems implement the concept of "virtual memory." Virtual memory allows the address space as seen by a process to appear as a single and contiguous address space when in actuality, the physical locations of data accessed by the process may be fragmentated, segmented, and/or stored in different types of storage (e.g., paged to disk.)

In an embodiment, an operating system's management of the resources used to implement virtual memory is assisted by a hardware memory allocation device. The memory allocation devices of a multi-processing system are interconnected via a load-store type fabric. The memory allocator devices for each node of the multi-processing system dynamically allocate both local pages of memory that are on a respective node, and remote pages that are on other nodes reachable via the fabric. Because the memory allocation devices handle the necessary address allocation and translation functions, different nodes of the multi-processing system may concurrently execute different operating system instances.

In an embodiment, a memory allocation device on an originating node (local node) requests an allocation of memory from a remote node (i.e., requests a remote allocation). In response, the memory allocation device on the remote node returns a global system address (a.k.a., global fabric address) that can be used to access the remote allocation from the originating node. Concurrent with the memory allocation device assigning (associating) a local (to its node) physical address to be used to access the remote allocation, the remote node allocates local physical memory to fulfill the remote allocation request. In this manner, the remote node has already completed the overhead operations associated with the remote allocation requested by the time the remote allocation is accessed by the originating node—thereby avoiding a second page fault caused by the remote node attempting to access memory that has not yet been allocated on the remote node.

Figure 1A:
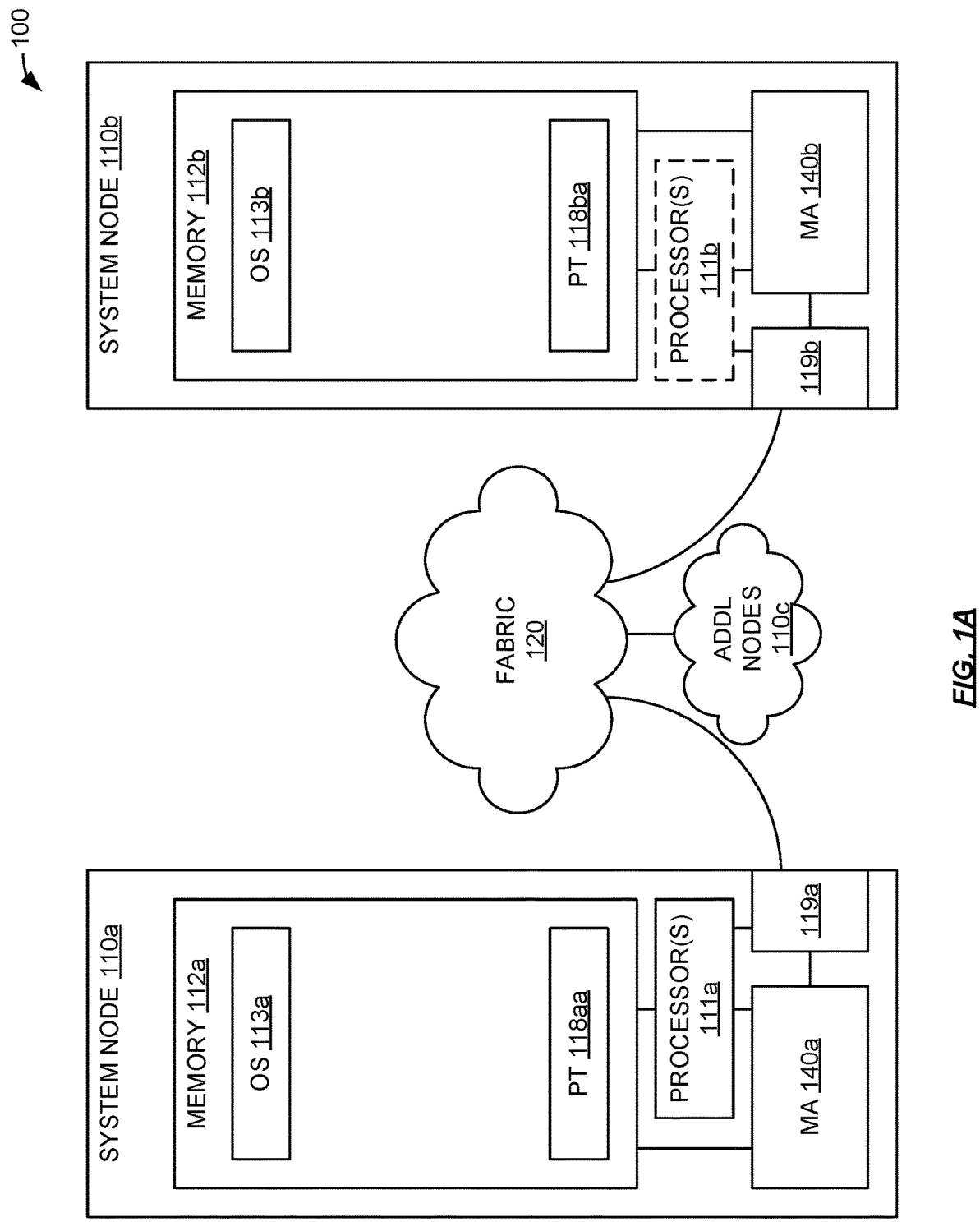

FIGS. 1A-1E are a block diagrams illustrating a fabric interconnected processing system. In FIG. 1A-1E, system 100 comprises system nodes 110a-110c, and fabric 120. System node 110a includes processor(s) 111a, memory 112a, memory allocation device 140a, and interface 119a. In FIG. 1A, memory 112a stores operating system 113a and a page table 118aa-118ac. System node 110b optionally includes processor(s) 111b, memory 112b, operating system 113b, memory allocation device 140b, and interface 119b. Memory 112b stores operating system 113b and a page table 118ba-118bc. Additional system nodes 110c include similar or the same elements as system nodes 110a-110b and are therefore, for the sake of brevity, not discussed further herein with reference to FIGS. 1A-1E.

System nodes 110a-110c are operatively coupled to fabric 120. System nodes 110a-110c are operatively coupled to fabric 120 to communicate and/or exchange information etc. with each other. Fabric 120 may be or comprise a switched fabric, point-to-point connections, and/or other interconnect architectures (e.g., ring topologies, crossbars, etc.) Fabric 120 may include links, linking, and/or protocols that are configured to be cache coherent. For example, fabric 120 may use links, linking, and/or protocols that include functionality described by and/or are compatible with one or more of Compute Express Link (CXL), Coherent Accelerator Processor Interface (CAPI), and Gen-Z standards, or the like. In an embodiment, system nodes 110a-110c are operatively coupled to fabric 120 to load and/or store information from/to memory 112a-112b that resides within other system nodes 110a-110c.

In FIG. 1A-1E, processor 111a of system node 110a is operatively coupled to memory 112a, memory allocation device 140a, and interface 119a. Memory allocation device 140a and processor 111a are operatively coupled via a local, to system node 110a, interface that is not shown in FIGS. 1A-1E. Memory allocation device 140a is operatively coupled to processor 111a, memory 112a, and interface 119a. Memory 112a may store operating system 113a and a page table 118aa-118ac. Processor 111a may execute operating system 113a. Similarly, optional processor 111b of system node 110b may be operatively coupled to memory 112b, memory allocation device 140b, and interface 119b. Memory allocation device 140b and optional processor 111b may be operatively coupled via a local, to system node 110b, interface that is not shown in FIGS. 1A-1E. Memory allocation device 140b may be operatively coupled to optional processor 111b, memory 112b, and interface 119b. Memory 112b may store operating system 113b and a page table 118ba-118bc. If present, optional processor 111b may execute operating system 113b.

In an embodiment, a process (e.g., process 1 or process 2) running on system node 110a may request an allocation of memory to store executable code and/or data. This request is typically made via a system procedure call to operating system 113a—which is itself a running process on system node 110a. In response, operating system 113a may return a virtual address that the process may use to access the requested allocation. However, operating system 113a may not immediately allocate one or more pages of physical memory 112a in response to the allocation request from the process. Rather, operating system 113a may defer allocating physical memory pages until the process accesses a virtual memory address associated with the requested (and now received) allocation. This scheme of memory management may also be referred to as "demand paging" or "on-demand paging."

In the context of memory allocation, demand paging follows the general rule that pages of physical memory 112a should only be allocated to virtual memory addresses if the executing process (e.g., process 1) demands them. To achieve this system node 110a uses a page table type implementation. A page table 118*aa*-118*ac* maps logical memory (i.e., virtual addresses) to physical memory (i.e., physical addresses.) A page table 118*aa*-118*ac* may use a bitwise operator or other indicator to mark in page table 118*aa*-118*ac* whether a virtual page (address) has been allocated a physical page (address.)

When a process tries to access a given virtual page, the following steps are generally followed: (1) processor 111*a* attempts to access page using a virtual address; (2) if the page is valid (i.e., is currently allocated a physical address) then processor 111*a* continues processing the instruction as normal; (3) If the page is invalid (i.e., is not currently allocated a physical address) then a page-fault occurs; (4) in response to the page-fault, operating system 113*a* requests that memory allocation device 140*a* allocate a physical memory page and associate the corresponding physical address with the faulting virtual page; (5) in response to the request, memory allocation device 140*a* allocates the physical memory page and associate the corresponding physical address with the faulting virtual page by updating a page table 118*aa*-118*ac*; and, (6) once a page table 118*aa*-118*ac* has been updated to reflect the association between the faulting virtual address and the newly allocated physical page address, the instruction that was interrupted by the page-fault is restarted by processor 111*a*. Optional processor 111*b*, operating system 113*b*, and memory allocation device 140*b* may perform similar functions for system node 110*b*.

As used herein, the descriptive term 'local' refers to whether accesses and/or communication between elements can be completed entirely within a system node 110*a*-110*c* without the use of fabric 120. The descriptive term 'remote' refers to whether accesses and/or communication between given elements cannot be completed entirely within a system node 110*a*-110*c* therefore must use fabric 120 for accesses and/or communication. Thus, for example, memory 112*a* is local memory 112*a* with respect to processor 111*a* because processor 111*a* and memory 112*a* reside on the same system node 110*a*. Conversely, memory 112*b* is remote memory 112*b* with respect to processor 111*a* because, since memory 112*b* is on system node 110*b*, processor 111*a* must use fabric 120 to access and/or communicate with memory 112*b*.

In an embodiment, as described herein, processor 111*a* may, under the control of operating system 113*a*, request an allocation of physical memory from memory allocation device 140*a*. In response memory allocation device 140*a* determines whether the allocation request is to be fulfilled with local physical memory 112*a* or is to be fulfilled with remote physical memory 112*b*. Memory allocation device 140*a* may determine whether to allocate local memory 112*a* versus remote memory 112*b* based on a governing policy specified by operating system 113*a*. This governing policy may include, for example, whether there is enough available (i.e., allocable) local memory 112*a* to fulfill the request. Other factors and/or indicators such as the type of process (e.g., operating system 113*a* process, user process, driver process, etc.) may also be considered by the governing policy.

If memory allocation device 140*a* determines the allocation request is to be fulfilled with local physical memory 112*a*, memory allocation device 140*a*, in cooperation with operating system 113*a*, updates page table 118*aa* to become page table 118*ab* to fulfill the allocation request using local memory 112*a*. This is illustrated in FIG. 1B by arrow 181 from memory allocation device 140*a* to updated page table 118*ab* and arrow 182 from updated page table 118*ab* to process 1 allocation 115*a* residing in memory 112*a* that is local with respect to processor 111*a* and memory allocation device 140*a*. This is also illustrated in FIG. 1B by arrow 183 from memory allocation device 140*a* to updated page table 118*ab* and arrow 184 from updated page table 118*ab* to process 2 allocation 116*a* residing in memory 112*a* that is local with respect to processor 111*a* and memory allocation device 140*a*.

Figure 1C:
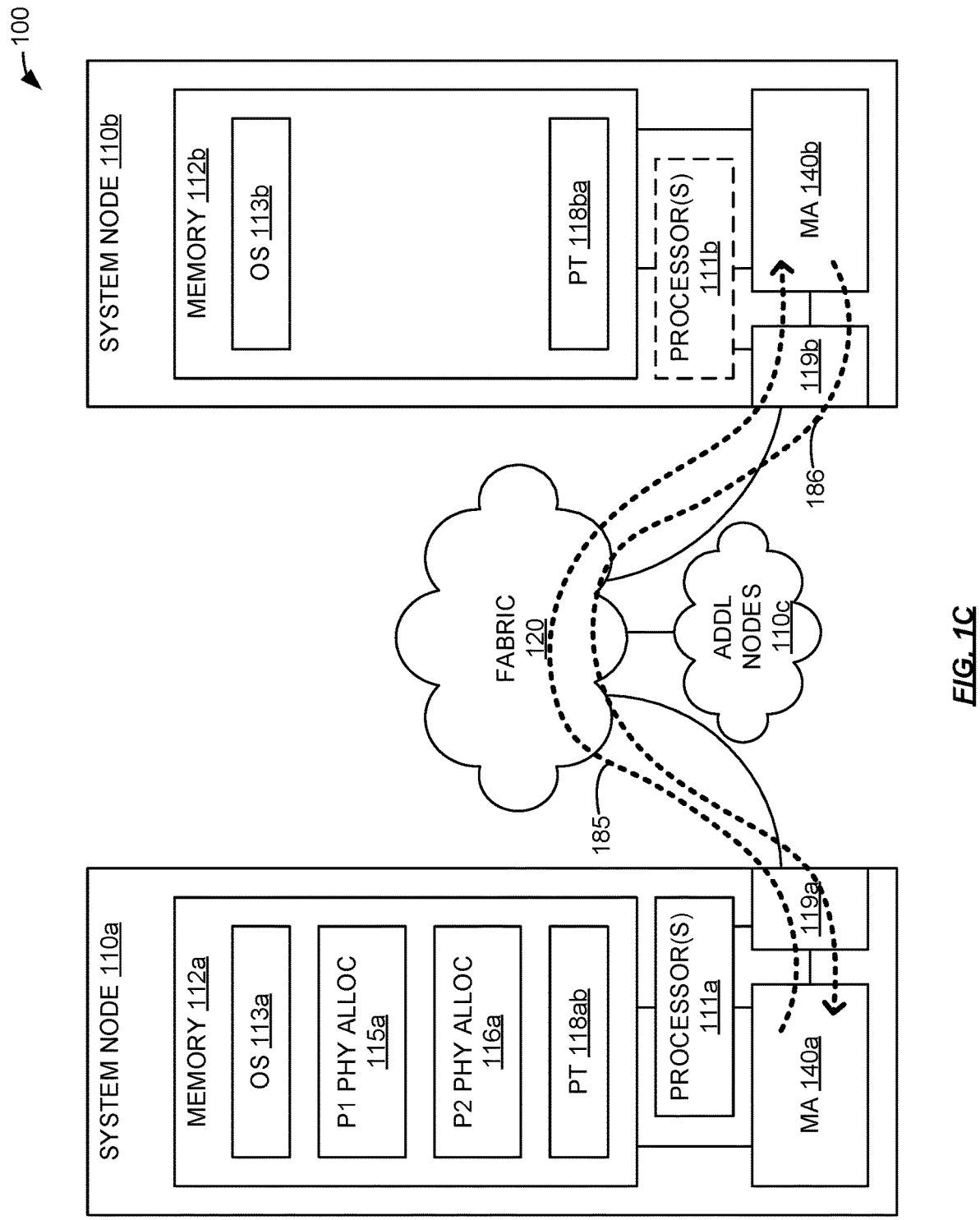

If memory allocation device 140*a* determines the allocation request is to be fulfilled with remote physical memory 112*b*, memory allocation device 140*a* transmits (via interface 119*a*, fabric 120, and interface 119*b*) a secondary allocation request to memory allocation device 140*b*. The secondary allocation requests a remote (to memory allocation device 140*a*) allocation of memory using memory 112*b* that is local to memory allocation device 140*b*. This is illustrated in FIG. 1C by arrow 185.

In response to the secondary allocation request, memory allocation device 140*b* transmits (via interface 119*b*, fabric 120, and interface 119*a*) a system address to memory allocation device 140*a* that memory allocation device 140*a* may use to access the requested allocation of memory in memory 112*b*. This system address may also be known as a "global fabric address" (GFA). If memory allocation device 140*b* cannot (or determines not to) fulfill the secondary request, memory allocation device 140*b* may return an indicator to that effect. Thus, by returning a system address, memory allocation device 140*b* is indicating that there is sufficient memory 112*b* available and reserved to fulfill the secondary allocation request. This is illustrated in FIG. 1C by arrow 186.

Figure 1D:
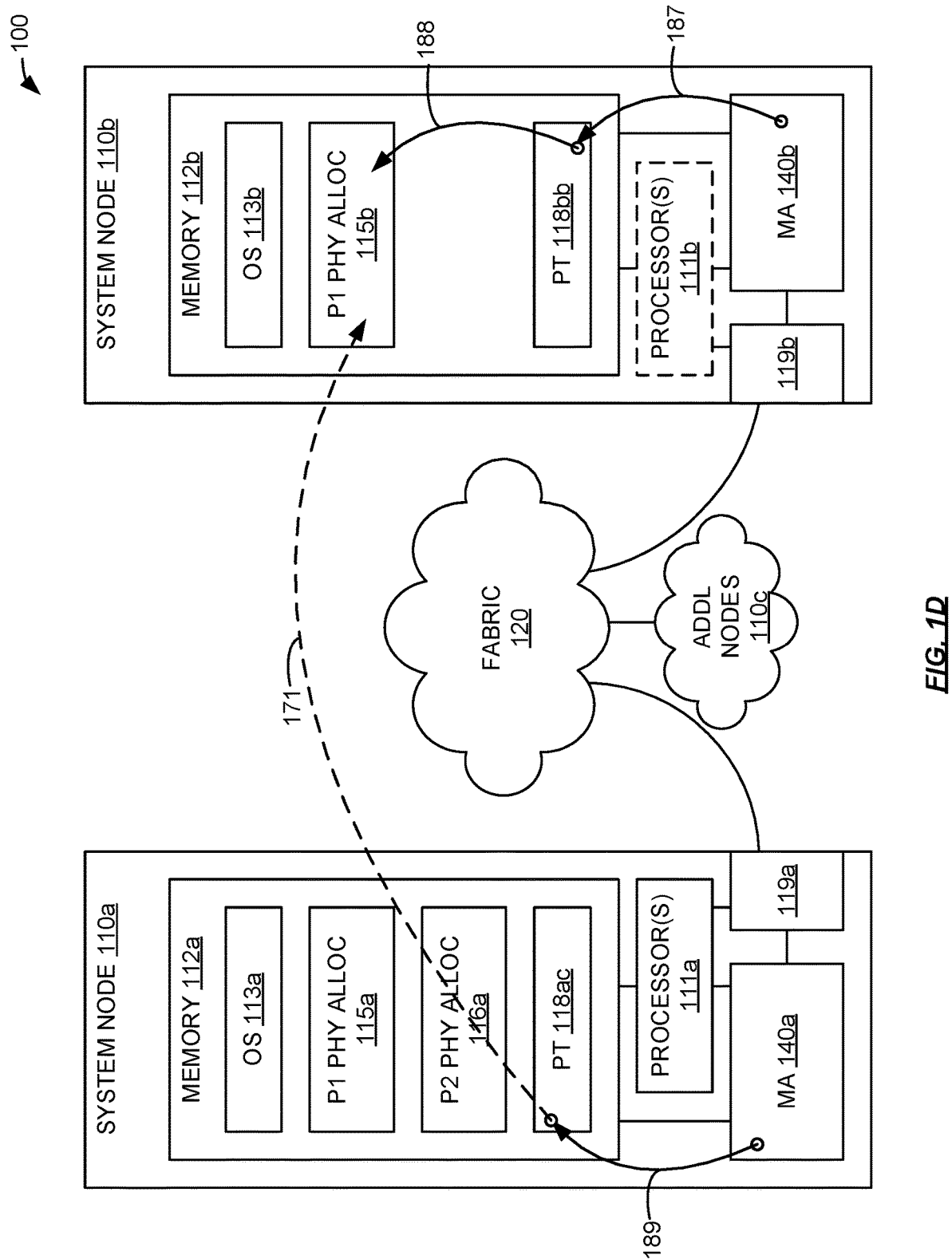

Memory allocation device 140*a* assigns (or associates) a local physical page address using the system address. Memory allocation device 140*a* assigns (or associates) the local physical page address with the system address such that accesses to the local physical address are redirected by memory allocation device 140*a* to memory allocation device 140*b*. Memory allocation device 140*a* may associate the local physical page address with the system address by updating page table 118*ab* to page table 118*ac* to indicate the system address is to be used for accesses to the page(s) addressed by the local physical address. This is illustrated in FIG. 1D by arrow 189 from memory allocation device 140*a* to page table 118*ac* and arrow 171 from page table 118*ac* to process 1 physical allocation 115*b* in memory 112*b* that is remote with respect to memory allocation device 140*a* and processor 111*a*.

In an embodiment, after or concurrently with transmitting the system address to memory allocation device 140*a*, memory allocation device 140*b*, in cooperation with operating system 113*b*, updates page table 118*ba* to page table 118*bb* to fulfill the secondary allocation request using local memory 112*b*. This is illustrated in FIG. 1D by arrow 187 from memory allocation device 140*b* to page table 118*bb* and arrow 188 from page table 118*bb* to process 1 physical allocation 115*b* that is local with respect to optional processor 111*b* (if present) and memory allocation device 140*b*.

In an embodiment, the assignment of local memory 112*b* and updating to page table 118*bb* to fulfill the secondary allocation request is performed concurrently with memory allocation device 140*a* associating the local physical page address with the system address and updating to page table 118*ac*. Thus, in other words, the operations represented by arrows 187-189 in FIG. 1D are performed concurrently.

In an embodiment, the assignment of local memory 112*b* and updating to page table 118*bb* to fulfill the secondary allocation request is completed before memory allocation device 140*a* transmits an access request (e.g., read or write) to memory allocation device 140*b* to access the secondary allocation of remote memory 112b (i.e., process 1 physical allocation 115b). In an embodiment, the secondary allocation of remote memory 112b may optionally be zeroed or otherwise have the contents of the secondary allocation erased or obscured. In an embodiment, this erasure may also complete before memory allocation device 140a transmits an access request (e.g., read or write) to memory allocation device 140b to access the secondary allocation of remote memory 112b (i.e., process 1 physical allocation 115b).

As described herein, when system nodes 110a-110c are using demand paging, the process of allocating a page is started by an access request to a page that has not yet been allocated causing a page-fault. Thus, most allocations (whether local or remote) will be followed a short time later by an access to that allocation. In the case of remote allocations, completing the assignment of local memory 112b and updating to page table 118bb to fulfill the secondary allocation request concurrently with memory allocation device 140a associating the local physical page address with the system address and updating to page table 118ac prevents a second page fault from occurring on the remote system node 110b when the access to that allocation is received a short time later. From the point of view of local system node 110a, performing these allocation processes in parallel (concurrently) improves the performance of allocating remote memory 112b relative to waiting for a second page-faulting access to arrive at the remote system node 110b.

Figure 1E:
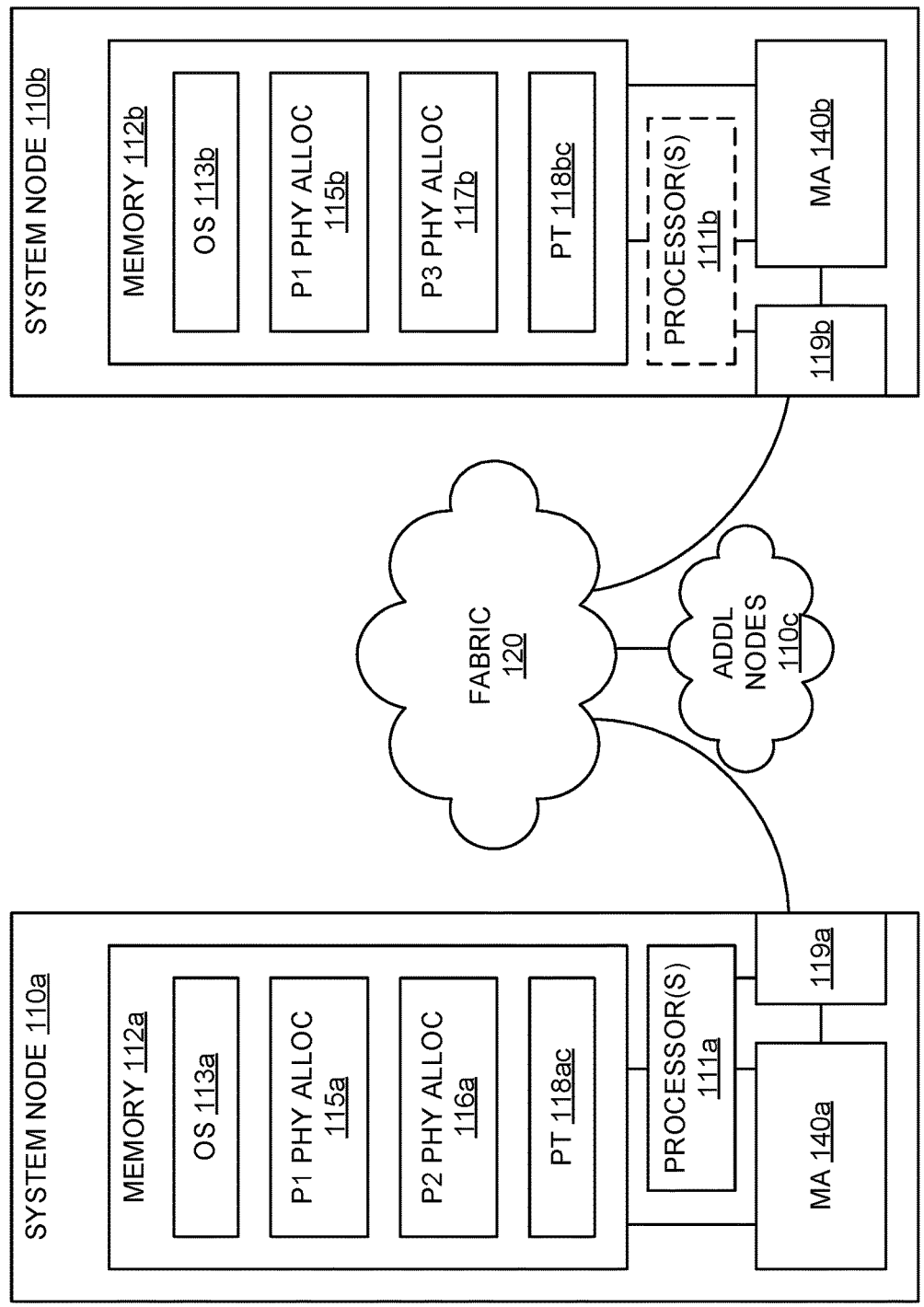

Memory allocation device 140b may also determine whether allocation requests are to be fulfilled with local (to optional processor 111b) physical memory 112b. This is illustrated in FIG. 1E by process 3 allocation 117b residing in memory 112b that is local with respect to optional processor 111b (if present) and memory allocation device 140b.

Figure 2:
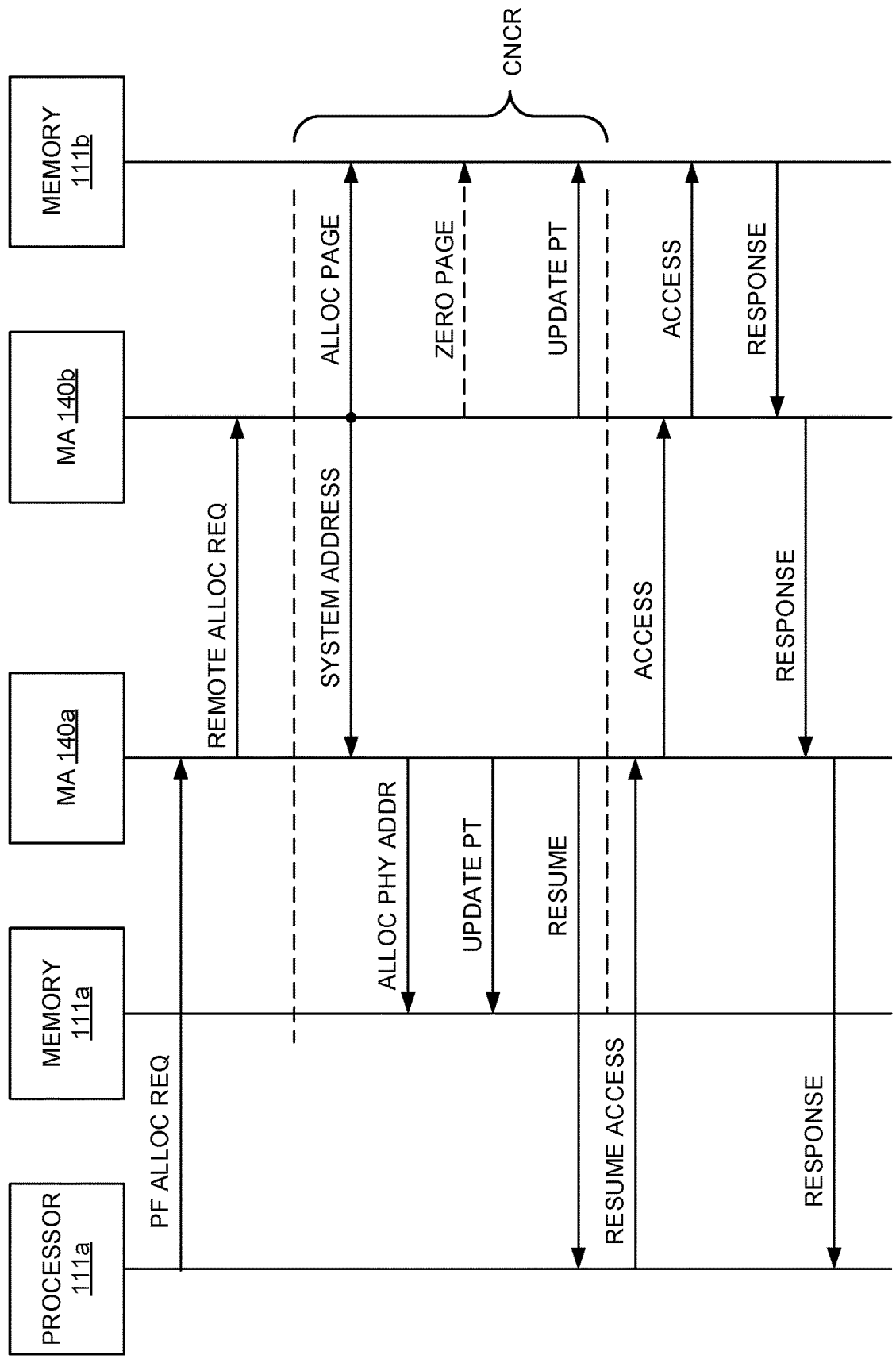
FIG. 2 is a flow diagram illustrating a method of allocating remote memory.

FIG. 2 is a flow diagram illustrating a method of allocating remote memory. A page-fault caused allocation request is received by memory allocation device 140a from processor 111a. Processor 111a may send the page-fault caused allocation request to memory allocation device 140a under the control of operating system 113a. After choosing to fulfill the page-fault caused allocation request with remote memory, memory allocation device 140a transmits a remote (secondary) allocation request to memory allocation device 140b.

In response to the remote allocation request, memory allocation device 140b transmits a system address to memory allocation device 140a that memory allocation device 140a may use to access the requested allocation of memory in memory 112b. After or concurrently with transmitting the system address to memory allocation device 140a, memory allocation device 140b fulfills the remote allocation request using local memory 112b. Optionally, memory allocation device 140b zeroes the allocated page. Memory allocation device 140b also updates the page table in memory 112b.

After receiving the system address from memory allocation device 140b, memory allocation device 140a assigns (or associates) a local physical page address using the system address. Memory allocation device 140a assigns (or associates) the local physical page address with the system address such that accesses to the local physical address are redirected by memory allocation device 140a to memory allocation device 140b. Memory allocation device 140a may associate the local physical page address with the system address by updating page table stored in memory 112a. Memory allocation device 140a transmits an indicator to processor 111a that processor 111a may resume the page-faulting instruction now that the page-fault caused allocation request has been fulfilled.

When processor 111a restarts the faulting instruction, processor 111a resumes an access instructing that caused the page-fault by sending an access request to memory allocation device 140a. Memory allocation device 140a redirects that access request to memory allocation device 140b. Memory allocation device 140b performs the access to memory 112b and receives a response. Memory allocation device 140b transmits the response to memory allocation device 140a. Memory allocation device 140a transmits the response to processor 111a thereby completing the instruction that caused the page-fault.

Figure 3A:
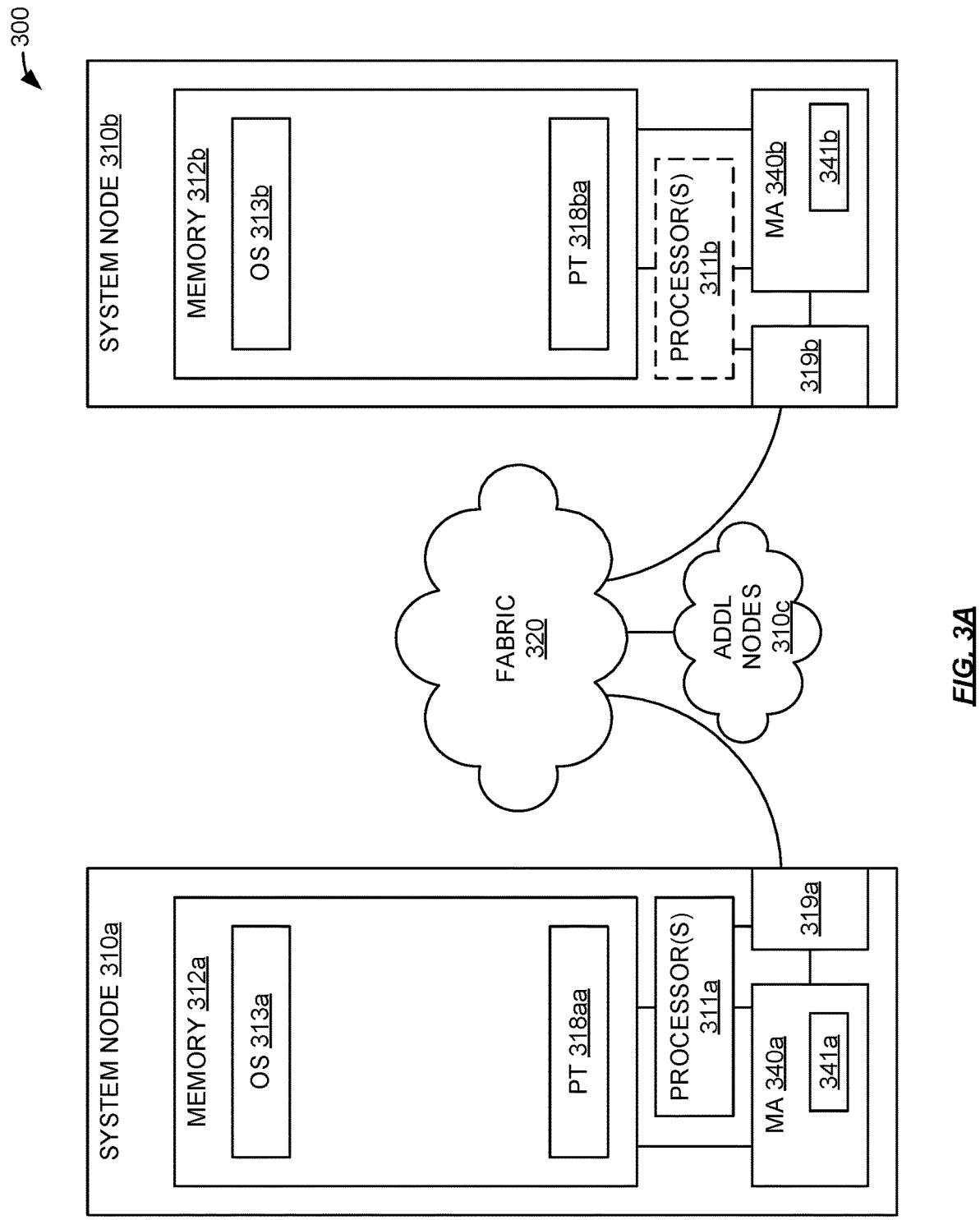
FIGS. 3A-3D are a block diagrams illustrating a fabric interconnected processing system.

FIGS. 3A-3D are a block diagrams illustrating a fabric interconnected processing system. In FIG. 3A-3D, system 300 comprises system nodes 310a-310c, and fabric 320. System node 310a includes processor(s) 311a, memory 312a, memory allocation device 340a, and interface 319a. Memory allocation device 340a includes system address pool 341a. In FIG. 3A, memory 312a stores operating system 313a and page table(s) 318aa. System node 310b may include optional processor(s) 311b, memory 312b, operating system 313b, memory allocation device 340b, and interface 319b. Memory allocation device 340b includes system address pool 341b. Memory 312b stores operating system 313b and page table(s) 318ba. Additional system nodes 310c include similar or the same elements as system nodes 310a-310b and are therefore, for the sake of brevity, not discussed further herein with reference to FIGS. 3A-3D.

System nodes 310a-310c are operatively coupled to fabric 320. System nodes 310a-310c are operatively coupled to fabric 320 to communicate and/or exchange information etc. with each other. Fabric 320 may be or comprise a switched fabric, point-to-point connections, and/or other interconnect architectures (e.g., ring topologies, crossbars, etc.) Fabric 320 may include links, linking, and/or protocols that are configured to be cache coherent. For example, fabric 320 may use links, linking, and/or protocols that include functionality described by and/or are compatible with one or more of Compute Express Link (CXL), Coherent Accelerator Processor Interface (CAPI), and Gen-Z standards, or the like. In an embodiment, system nodes 310a-310c are operatively coupled to fabric 120 to load and/or store information from/to memory 312a-312b that resides within other system nodes 310a-310c.

In FIGS. 3A-3D, processor 311a of system node 310a is operatively coupled to memory 312a, memory allocation device 340a, and interface 319a. Memory allocation device 340a and processor 311a are operatively coupled via a local, to system node 310a, interface that is not shown in FIGS. 3A-3D. Memory allocation device 340a is operatively coupled to processor 311a, memory 312a, and interface 319a. Memory 312a may store operating system 313a and a page table 318aa-318ab. Processor 311a may execute operating system 313a. Similarly, optional processor 311b of system node 310b may be operatively coupled to memory 312b, memory allocation device 340b, and interface 319b. Memory allocation device 340b and optional processor 311b may be operatively coupled via a local, to system node 310b, interface that is not shown in FIGS. 3A-3D. Memory allocation device 340b may be operatively coupled to optional processor 311b, memory 312b, and interface 319b. Memory 312b may store operating system 313b and a page table 318ba-318bb. If present, processor 311a may execute operating system 313a.

Figure 3B:
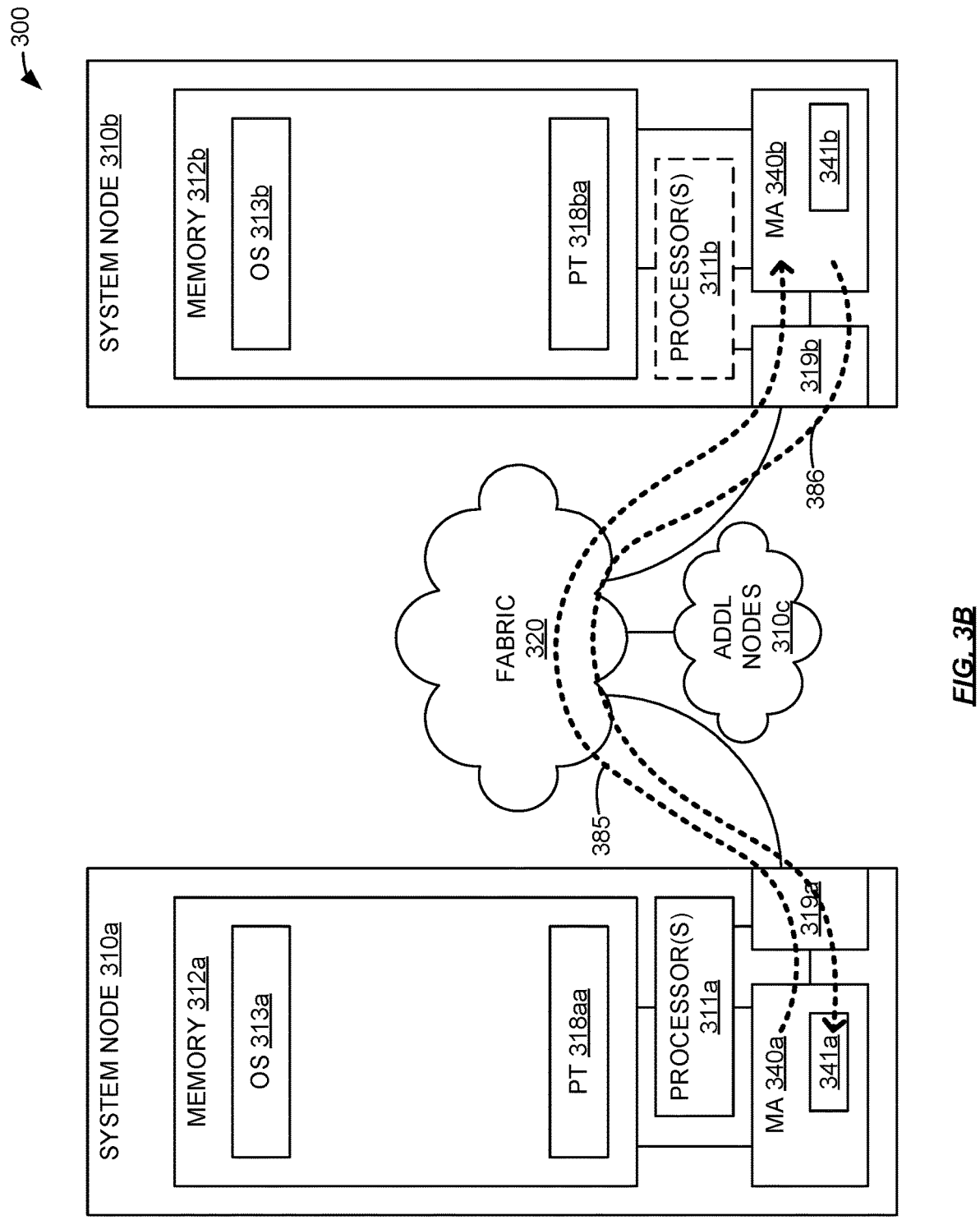

In an embodiment, in anticipation of needing a remote memory allocation, memory allocation device 340*a* transmits (via interface 319*a*, fabric 320, and interface 319*b*) an allocation request (pool allocation request) to memory allocation device 340*b*. The pool allocation requests a remote (to memory allocation device 340*a*) allocation of memory using memory 312*b* that is local to memory allocation device 340*b*. This is illustrated in FIG. 3B by arrow 385.

In response to the pool allocation request, memory allocation device 340*b* transmits (via interface 319*b*, fabric 320, and interface 319*a*) a system address to memory allocation device 340*a* that memory allocation device 340*a* may use to access the requested allocation of memory in memory 312*b*. If memory allocation device 340*b* cannot (or determines not to) fulfill the pool allocation request, memory allocation device 340*b* may return an indicator to that effect. Thus, by returning a system address, memory allocation device 340*b* is indicating that there is sufficient memory 312*b* available and reserved to fulfill the pool allocation request. Memory allocation device 340*a* stores the system address in system address pool 341*a* to await an allocation request that is to be fulfilled using remote memory 312*b*. This is illustrated in FIG. 3B by arrow 386.

Figure 3C:
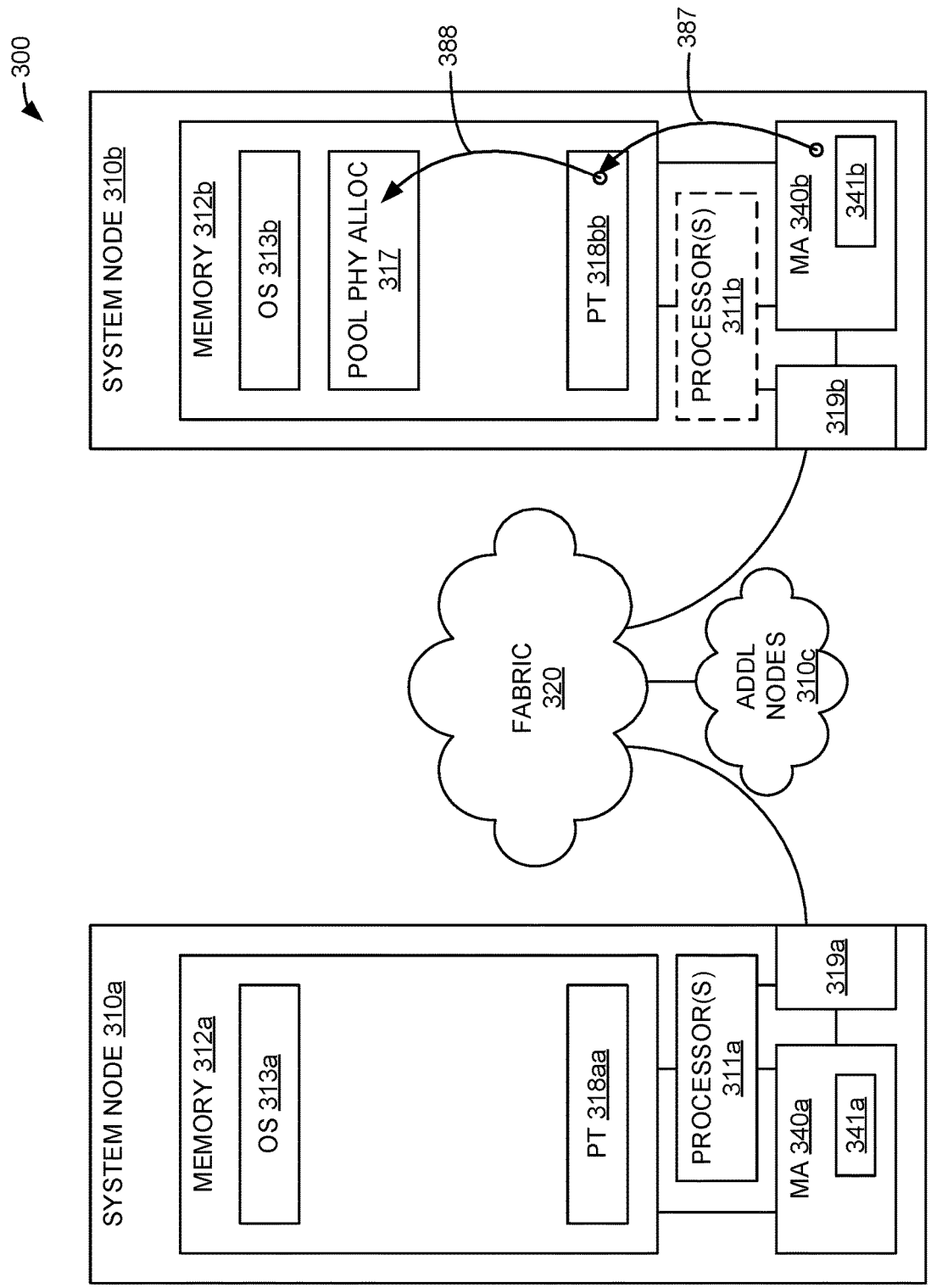

After or concurrently with transmitting the system address to memory allocation device 340*a*, memory allocation device 340*b*, in cooperation with operating system 313*b*, updates page table 318*ba* to page table 318*bb* to fulfill the pool allocation request using local memory 312*b*. This is illustrated in FIG. 3C by arrow 387 from memory allocation device 340*b* to page table 318*bb* and arrow 388 from page table 318*bb* to pool physical allocation 317 that is local with respect to processor 311*b* (if present) and memory allocation device 340*b*.

Figure 3D:
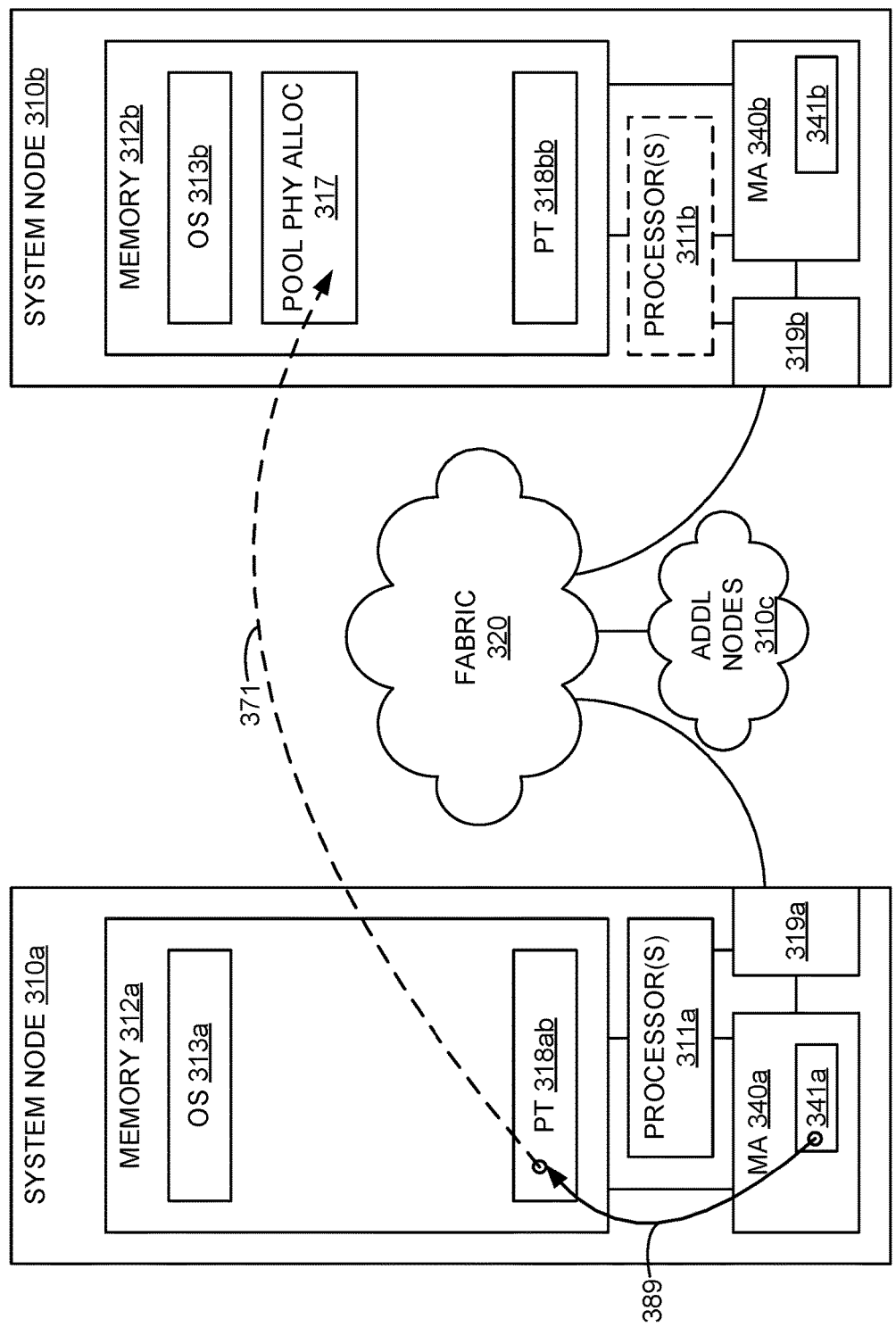

In response to receiving a memory allocation request from processor 311*a* that memory allocation device 340*a* determines to fulfill with remote memory 312*b*, memory allocation device 340*a* assigns (or associates) a local physical page address using the system address. Memory allocation device 340*a* assigns (or associates) the local physical page address with the system address such that accesses to the local physical address are redirected by memory allocation device 340*a* to memory allocation device 340*b*. Memory allocation device 340*a* may associate the local physical page address with the system address by updating page table 318*aa* to page table 318*ab* to indicate the system address is to be used for accesses to the page(s) addressed by the local physical address. This is illustrated in FIG. 3D by arrow 389 from memory allocation device 340*a* to page table 318*ab* and arrow 371 from page table 318*ab* to pool physical allocation 317 in memory 312*b* that is remote with respect to memory allocation device 340*a* and processor 311*a*.

Figure 4:
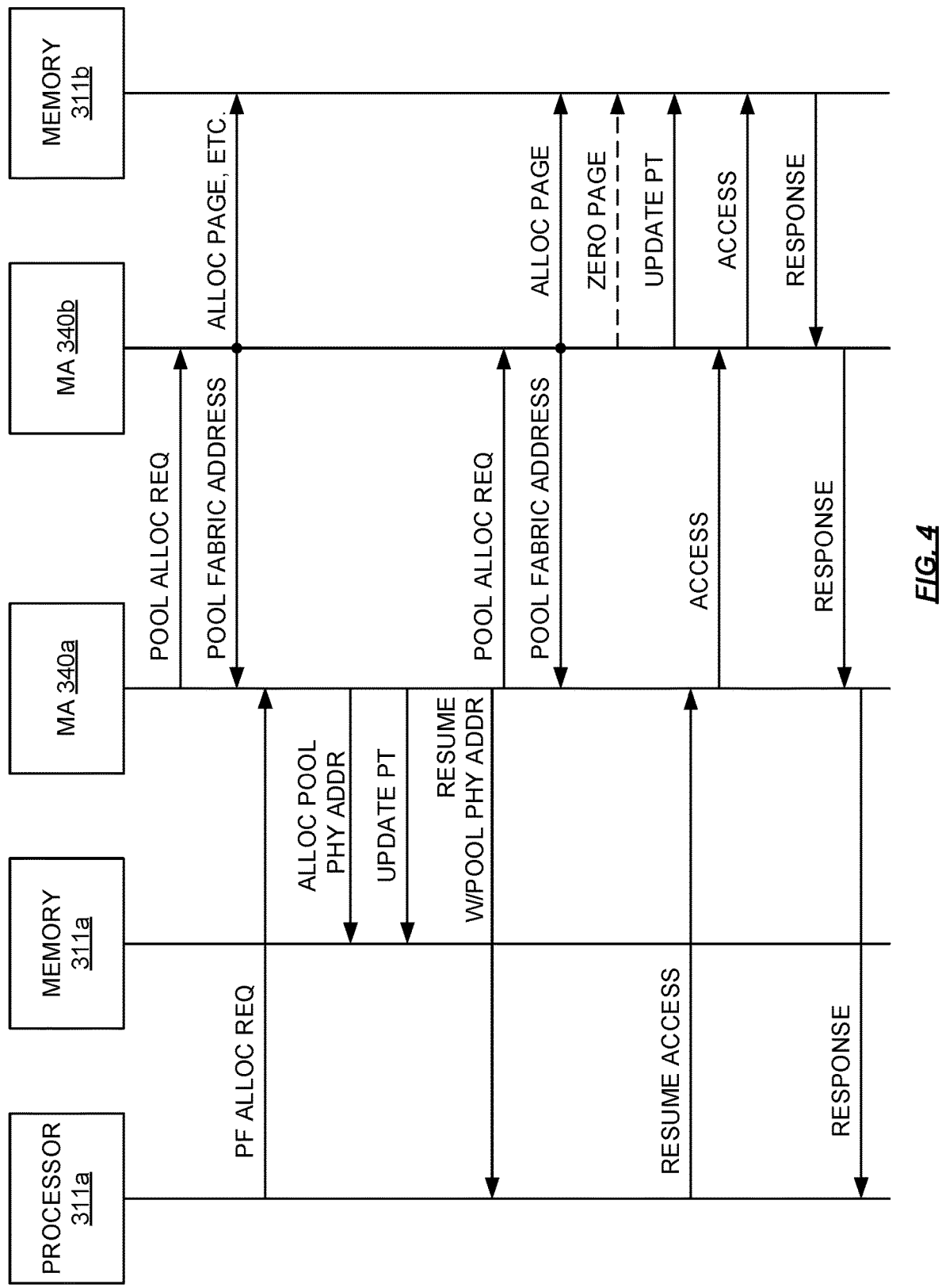
FIG. 4 is a flow diagram illustrating a method of allocating remote memory for use by a local processing system.

FIG. 4 is a flow diagram illustrating a method of allocating remote memory for use by a local processing system. In anticipation of needing a remote memory allocation, memory allocation device 340*a* transmits a remote (pool) allocation request to memory allocation device 340*b*. In response to the pool allocation request, memory allocation device 340*b* transmits a system address to memory allocation device 340*a* that memory allocation device 340*a* may use to access the requested allocation of memory in memory 312*b*. After or concurrently with transmitting the system address to memory allocation device 340*a*, memory allocation device 340*b* fulfills the remote allocation request using local memory 312*b*. Optionally, memory allocation device 340*b* zeroes the allocated page. Memory allocation device 340*b* also updates the page table in memory 312*b*. Memory allocation device 340*a* stores the system address in system address pool 341*a* to await an allocation request that is to be fulfilled using remote memory 312*b*.

A page-fault caused allocation request is received by memory allocation device 340*a* from processor 311*a*. Processor 311*a* may send the page-fault caused allocation request to memory allocation device 340*a* under the control of operating system 313*a*. After choosing to fulfill the page-fault caused allocation request with remote memory, memory allocation device 340*a* assigns (or associates) a local physical page address using with the system address from system address pool 341*a*. Memory allocation device 340*a* assigns (or associates) the local physical page address with the system address such that accesses to the local physical address are redirected by memory allocation device 340*a* to memory allocation device 340*b*. Memory allocation device 340*a* may associate the local physical page address with the system address by updating page table stored in memory 312*a*. Memory allocation device 340*a* transmits an indicator to processor 311*a* that processor 311*a* may resume the page-faulting instruction now that the page-fault caused allocation request has been fulfilled.

Once a pool address from system address pool 341*a* has been allocated/used, memory allocation device may refill system address pool 341*a*. To refill/replace a used system address in system address pool 341, memory allocation device 340*a* transmits a remote (pool) allocation request to memory allocation device 340*b*. In response to the pool allocation request, memory allocation device 340*b* transmits a second system address to memory allocation device 340*a* that memory allocation device 340*a* may use to access a second requested allocation of memory in memory 312*b*. After or concurrently with transmitting the second system address to memory allocation device 340*a*, memory allocation device 340*b* fulfills the second remote allocation request using local memory 312*b*. Optionally, memory allocation device 340*b* zeroes the second allocated page. Memory allocation device 340*b* also updates the page table in memory 312*b*. Memory allocation device 340*a* stores the second system address in system address pool 341*a* to await an allocation request that is to be fulfilled using remote memory 312*b*.

When processor 311*a* restarts the faulting instruction, processor 311*a* resumes an access instructing that caused the page-fault by sending an access request to memory allocation device 340*a*. Memory allocation device 340*a* redirects that access request to memory allocation device 340*b*. Memory allocation device 340*b* performs the access to memory 312*b* and receives a response. Memory allocation device 340*b* transmits the response to memory allocation device 340*a*. Memory allocation device 340*a* transmits the response to processor 311*a* thereby completing the instruction that caused the page-fault.

FIG. 5 is a flowchart illustrating a method of allocating memory. One or more steps illustrated in FIG. 5 may be performed by, for example, system 100, system 300, and/or their components. Via a first interface and from a first processor that is local with respect to a first memory allocation device, a first request is received where the first request is to be fulfilled by a first allocation of memory that is not local with respect to the first processor (502). For example, memory allocation device 140*a* may receive, from processor 111 under the control of operating system 113*a*, a request an allocation of physical memory. In response, memory allocation device 140*a* may determine that the allocation request is to be fulfilled using remote physical memory 112*b*.

Via a second interface and to a second memory allocation device that is not local with respect to the first processor, a second request is transmitted where the second request is for a second allocation of memory that is local with respect to the second memory allocation device (504). For example, memory allocation device 140a may transmits (via interface 119a, fabric 120, and interface 119b) a secondary allocation request to memory allocation device 140b. This secondary allocation requests a remote (to memory allocation device 140a) allocation of memory using memory 112b that is local to memory allocation device 140b and optional processor 111b (if present).

Via the second interface and from the second memory allocation device, receive a system address to be used to access the second allocation of memory (506). For example, memory allocation device 140a may receive, from memory allocation device 140b a system address that memory allocation device 140a may use to access the requested allocation of memory in memory 112b. The system address is associated with a first physical address that is local with respect to the first processor concurrently with the second memory allocation device allocation a first block of memory corresponding to the second allocation of memory (508). For example, memory allocation device 140a may assign (or associate with) a local physical page using with the system address. Concurrently with memory allocation device 140a may the local physical page address, memory allocation device 140b, in cooperation with operating system 113b (if present), may update page table 118ba to page table 118bb to fulfill the secondary allocation request using local memory 112b.

Figure 6:
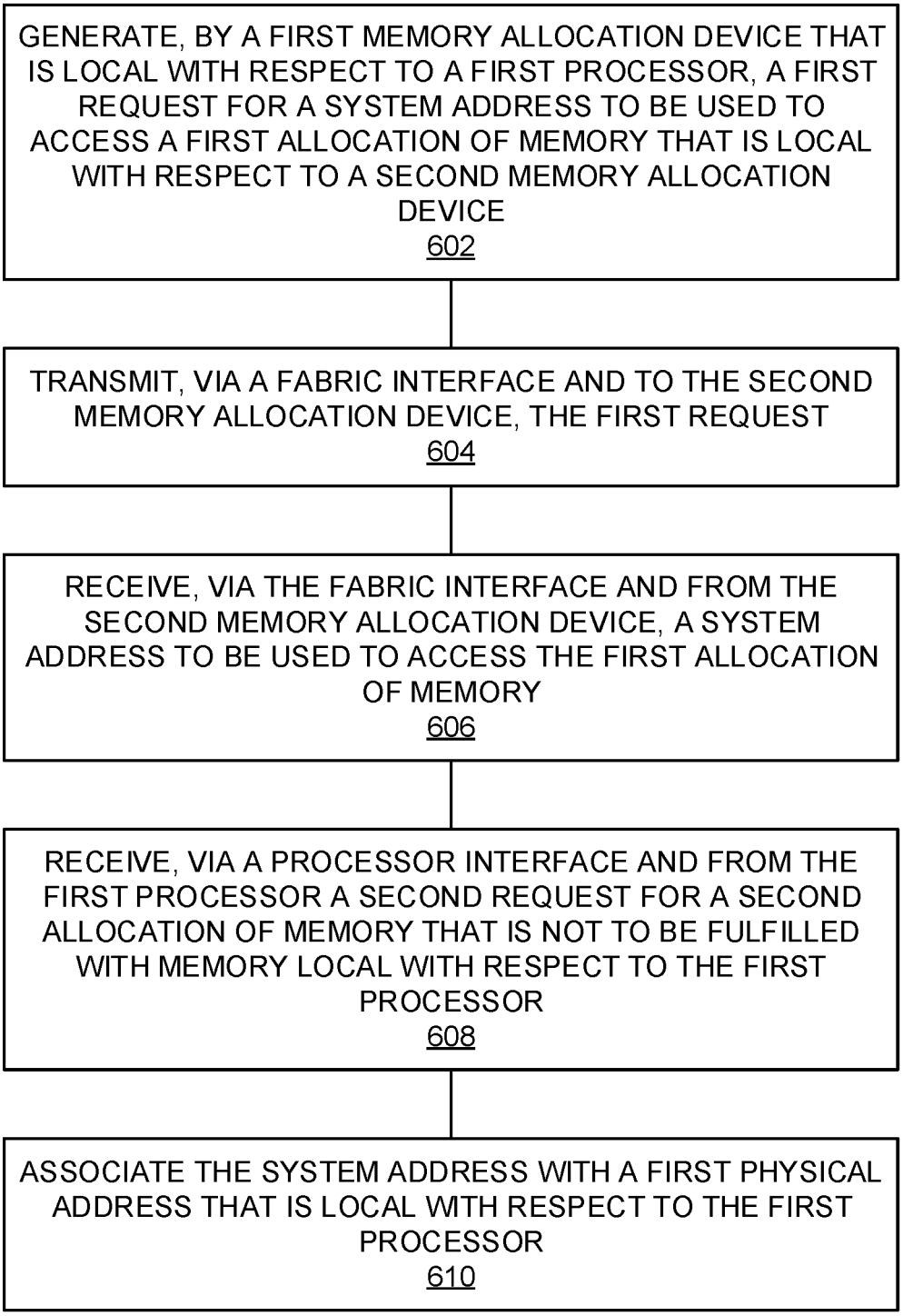
FIG. 6 is a flowchart illustrating a method of allocating remote memory.

FIG. 6 is a flowchart illustrating a method of allocating remote memory. One or more steps illustrated in FIG. 6 may be performed by, for example, system 100, system 300, and/or their components. By a first memory allocation device that is local with respect to a first processor, a first request for a system address to be used to access a first allocation of memory that is local with respect to a second memory allocation device is generated (602). For example, in anticipation of needing a remote memory allocation, memory allocation device 340a may generate an allocation request (pool allocation request) in order to receive a system address to be stored in system address pool 341a.

Via a fabric interface and to the second memory allocation device, the first request is transmitted (604). For example, in anticipation of needing a remote memory allocation, memory allocation device 340a may transmit (via interface 319a, fabric 320, and interface 319b), to memory allocation device 340b, the pool allocation request for a remote (to memory allocation device 340a) memory allocation. Via the fabric interface and from the second memory allocation device, a system address to be used to access the first allocation of memory is received (606). For example, memory allocation device 340a may receive, via interface 319b, fabric 320, and interface 319a and from memory allocation device 140b, a system address that memory allocation device 340a may use to access the requested allocation of memory in memory 312b. Memory allocation device 340a may store the received system address in system address pool 341a.

Via a processor interface and from the first processor, a second request for a second allocation of memory that is not local with respect to the first processor is received (608). For example, a page-fault caused allocation request may be received by memory allocation device 340a from processor 311a. Processor 311a may have sent the page-fault caused allocation request to memory allocation device 340a under the control of operating system 313a. The system address is associated with a first physical address that is local with respect to the first processor (610). For example, after choosing to fulfill the page-fault caused allocation request with remote memory, memory allocation device 340a may assigns (or associate) a local physical page address with the system address from system address pool 341a. Memory allocation device 340a may assign (or associate) the local physical page address with the system address such that accesses to the local physical address are redirected by memory allocation device 340a to memory allocation device 340b. Memory allocation device 340a may associate the local physical page address with the system address by updating a page table stored in memory 312a. Memory allocation device 340a may transmit an indicator to processor 311a that processor 311a may resume the page-faulting instruction now that the page-fault caused allocation request has been fulfilled.

Figure 7A:
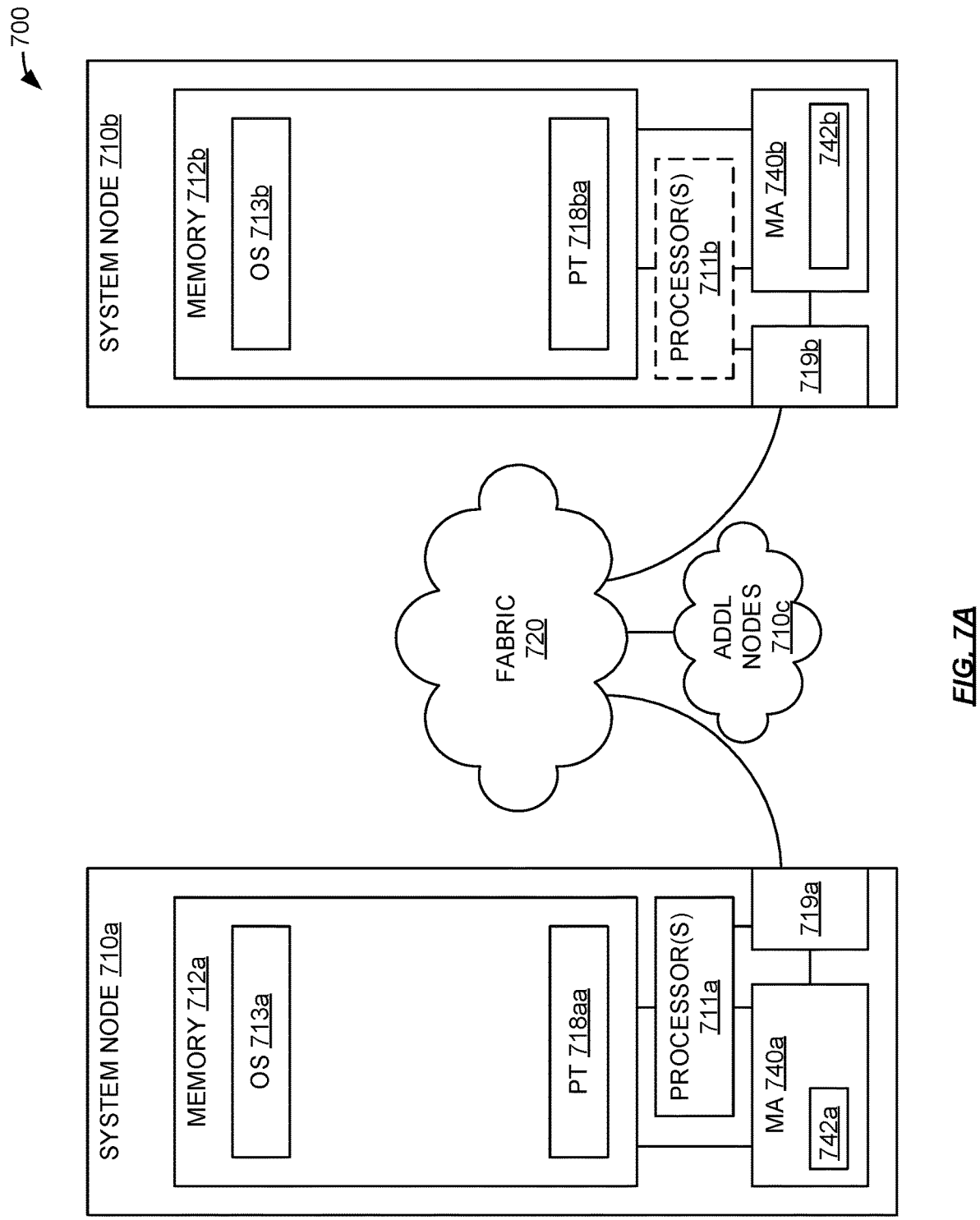

FIGS. 7A-7D are a block diagrams illustrating a fabric interconnected processing system. In FIG. 7A-7D, system 700 comprises system nodes 710a-710c, and fabric 720. System node 710a includes processor(s) 711a, memory 712a, memory allocation device 740a, and interface 719a. Memory allocation device 740a includes locally pre-allocated system address pool 742a. In FIG. 7A, memory 712a stores operating system 713a and page table(s) 718aa. System node 710b may include optional processor(s) 711b, memory 712b, operating system 713b, memory allocation device 740b, and interface 719b. Memory allocation device 740b includes locally pre-allocated system address pool 742b. Memory 712b stores operating system 713b and page table(s) 718ba. Additional system nodes 710c include similar or the same elements as system nodes 710a-710b and are therefore, for the sake of brevity, not discussed further herein with reference to FIGS. 7A-7D.

System nodes 710a-710c are operatively coupled to fabric 720. System nodes 710a-710c are operatively coupled to fabric 720 to communicate and/or exchange information etc. with each other. Fabric 720 may be or comprise a switched fabric, point-to-point connections, and/or other interconnect architectures (e.g., ring topologies, crossbars, etc.) Fabric 720 may include links, linking, and/or protocols that are configured to be cache coherent. For example, fabric 720 may use links, linking, and/or protocols that include functionality described by and/or are compatible with one or more of Compute Express Link (CXL), Coherent Accelerator Processor Interface (CAPI), and Gen-Z standards, or the like. In an embodiment, system nodes 710a-710c are operatively coupled to fabric 120 to load and/or store information from/to memory 712a-712b that resides within other system nodes 710a-710c.

In FIGS. 7A-7D, processor 711a of system node 710a is operatively coupled to memory 712a, memory allocation device 740a, and interface 719a. Memory allocation device 740a and processor 711a are operatively coupled via a local, to system node 710a, interface that is not shown in FIGS. 7A-7D. Memory allocation device 740a is operatively coupled to processor 711a, memory 712a, and interface 719a. Memory 712a may store operating system 713a and a page table 718aa-718ab. Processor 711a may execute operating system 713a. Similarly, optional processor 711b of system node 710b may be operatively coupled to memory 712b, memory allocation device 740b, and interface 719b. Memory allocation device 740b and optional processor 711b may be operatively coupled via a local, to system node 710b, interface that is not shown in FIGS. 7A-7D. Memory allocation device 740b may be operatively coupled to optional processor 711*b*, memory 712*b*, and interface 719*b*. Memory 712*b* may store operating system 713*b* and a page table 718*ba*-318*bb*. If present, optional processor 711*b* may execute operating system 713*b*.

Figure 7B:
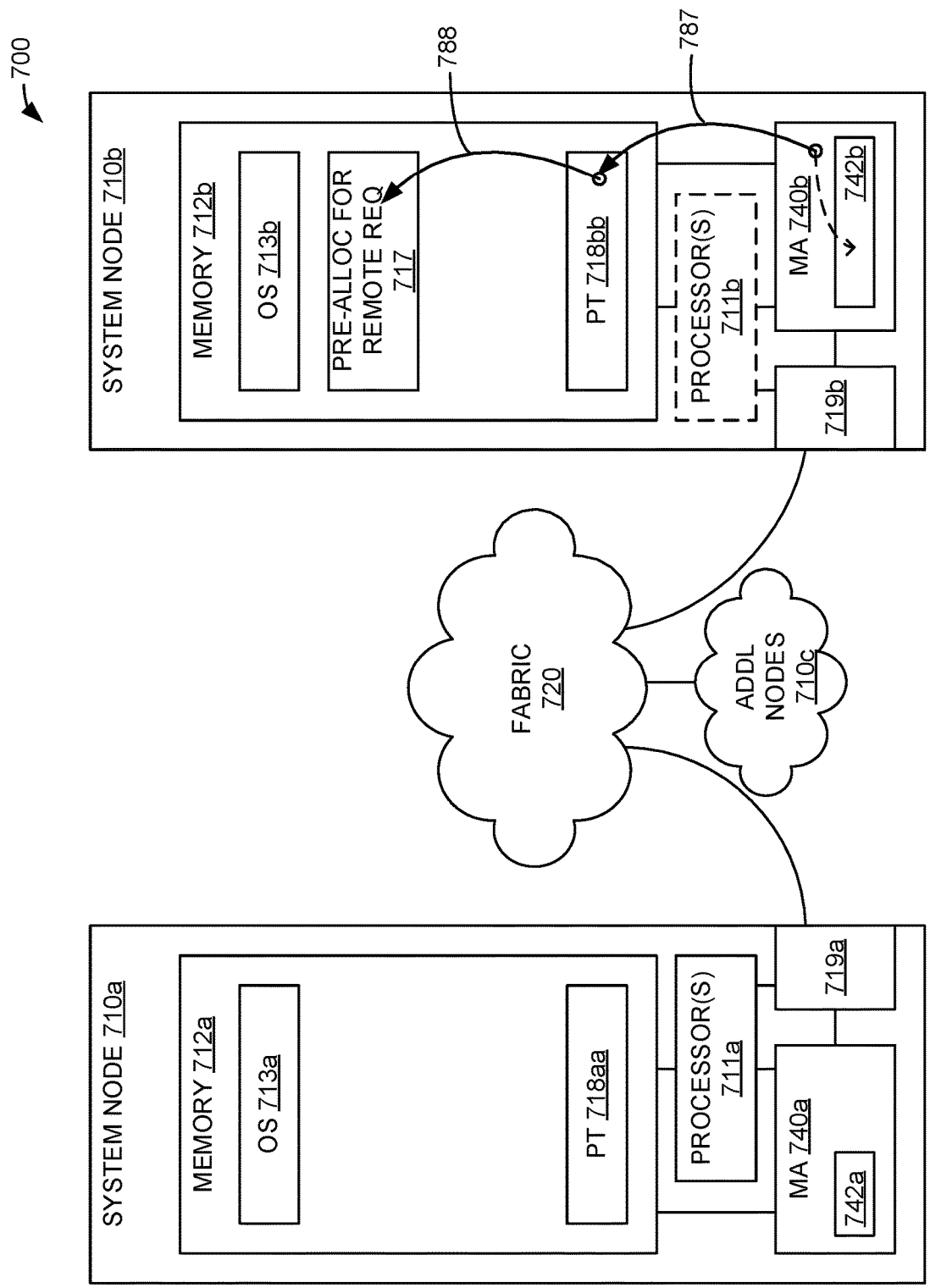

In an embodiment, in anticipation of receiving a remote memory allocation request, memory allocation device 740*b*, in cooperation with operating system 713*b*, updates page table 718*ba* to page table 718*bb* to pre-allocate a portion or portions of local memory 712*b* to be used to fulfill remote memory allocation requests that are received. This is illustrated in FIG. 7B by arrow 787 from memory allocation device 740*b* to page table 718*bb* and arrow 788 from page table 718*bb* to pre-allocated physical allocation 717 that is local with respect to processor 711*b* (if present) and memory allocation device 740*b*. Memory allocation device 740*b* also stores in address pool 742*b* a system address that other devices (e.g., memory allocation device 740*a* and/or nodes 710*c*) may use to access pre-allocated physical allocation 717 in memory 712*b*. Memory allocation device 740*b* stores the system address in address pool 742*b* to await an allocation request that is to be fulfilled using locally pre-allocated physical allocation 717. Memory allocation device 740*b* may optionally zero or otherwise have the contents of the allocation 717 erased or obscured.

Memory allocation device 740*a* transmits (via interface 719*a*, fabric 720, and interface 719*b*) an allocation request to memory allocation device 740*b*. The allocation requests a remote (to memory allocation device 740*a*) allocation of memory using memory 712*b* that is local to memory allocation device 740*b*. This is illustrated in FIG. 7C by arrow 785.

In response to the allocation request, memory allocation device 740*b* transmits (via interface 719*b*, fabric 720, and interface 719*a*) a system address from locally pre-allocated system address pool 742*b* to memory allocation device 740*a* that memory allocation device 740*a* may use to access the pre-allocated physical allocation 717 in memory 712*b*. By returning a system address, memory allocation device 740*b* is indicating that there is sufficient memory 712*b* available and reserved to fulfill the pool allocation request. This is illustrated in FIG. 7B by arrow 786.

Figure 7D:
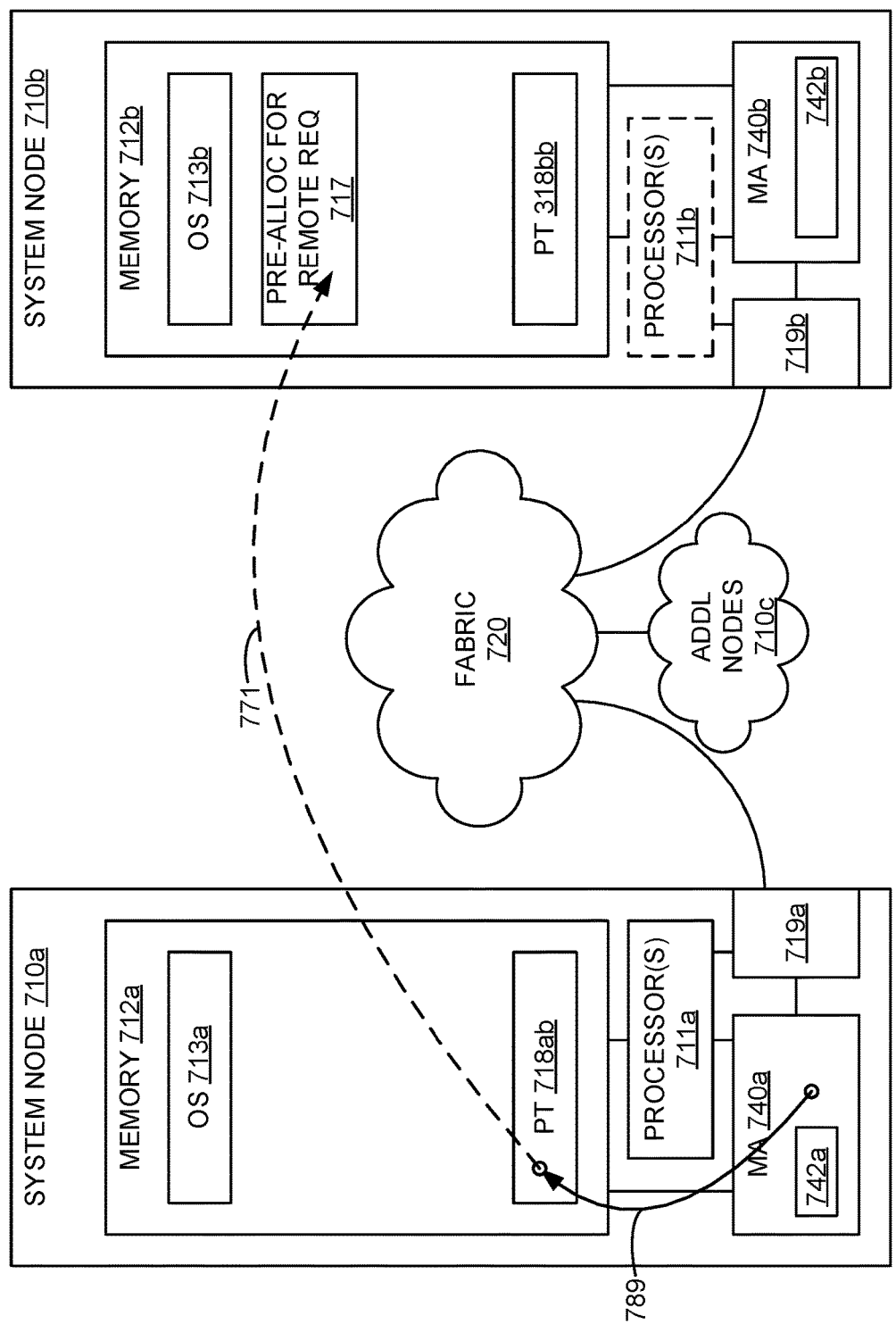

After receiving the (locally pre-allocated in memory 712*b*) system address from memory allocation device 740*b*, memory allocation device 740*a* assigns (or associates) a local physical page address using the system address. Memory allocation device 740*a* assigns (or associates) the local physical page address with the system address such that accesses to the local physical address are redirected by memory allocation device 740*a* to memory allocation device 740*b*. Memory allocation device 740*a* may associate the local physical page address with the system address by updating page table 718*aa* to page table 718*ab* to indicate the system address is to be used for accesses to the page(s) addressed by the local physical address. This is illustrated in FIG. 7D by arrow 789 from memory allocation device 740*a* to page table 718*ab* and arrow 771 from page table 718*ab* to allocation 717 in memory 712*b* that is remote with respect to memory allocation device 740*a* and processor 711*a*.

Figure 8:
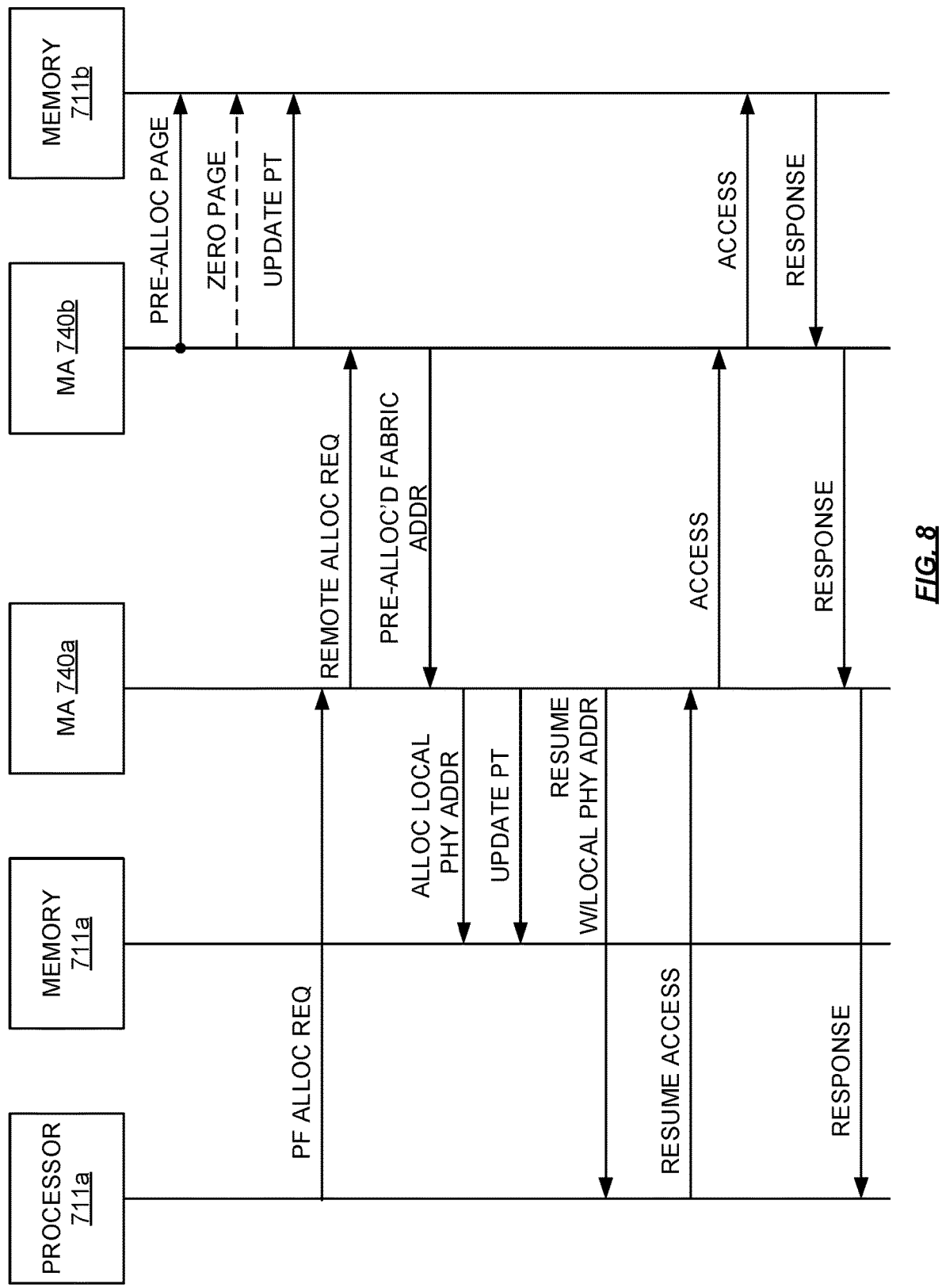
FIG. 8 is a flow diagram illustrating a method of pre-allocating remote memory.

FIG. 8 is a flow diagram illustrating a method of allocating remote memory for use by a local processing system. In anticipation of receiving a remote memory allocation request, memory allocation device 740*b*, pre-allocates a block of memory (e.g., allocation 717) using local memory 712*b*. Optionally, memory allocation device 740*b* zeroes the pre-allocated page. Memory allocation device 740*b* also updates the page table in memory 712*b*. Memory allocation device 740*b* stores a system address that can be used to access the pre-allocated block of memory in system address pool 742*b* to await an allocation request that is to be fulfilled using memory 712*b*.

A page-fault caused allocation request is received by memory allocation device 740*a* from processor 711*a*. Processor 711*a* may send the page-fault caused allocation request to memory allocation device 740*a* under the control of operating system 713*a*. After choosing to fulfill the page-fault caused allocation request with remote memory, memory allocation device 740*a* transmits a remote allocation request to memory allocation device 740*b*. In response to the remote allocation request, memory allocation device 740*b* transmits a pre-allocated system address to memory allocation device 740*a* that memory allocation device 740*a* may use to access the requested (and pre-allocated) allocation of memory in memory 712*b*.

Memory allocation device 740*a* assigns (or associates) a local physical page address with the system address received from memory allocation device 740*b*. Memory allocation device 740*a* assigns (or associates) the local physical page address with the system address such that accesses to the local physical address are redirected by memory allocation device 740*a* to memory allocation device 740*b*. Memory allocation device 740*a* may associate the local physical page address with the system address by updating page table stored in memory 712*a*. Memory allocation device 740*a* transmits an indicator to processor 711*a* that processor 711*a* may resume the page-faulting instruction now that the page-fault caused allocation request has been fulfilled.

When processor 711*a* restarts the faulting instruction, processor 711*a* resumes an access instructing that caused the page-fault by sending an access request to memory allocation device 740*a*. Memory allocation device 740*a* redirects that access request to memory allocation device 740*b*. Memory allocation device 740*b* performs the access to memory 712*b* and receives a response. Memory allocation device 740*b* transmits the response to memory allocation device 740*a*. Memory allocation device 740*a* transmits the response to processor 111*a* thereby completing the instruction that caused the page-fault.

It should be understood that for the sake of clarity, the functions and systems described herein have been described separately. However, these function, systems, and their components may be combined in various ways. For example, system 100 may be modified or configured to have and/or perform the functions described herein with respect to one or more of system 300 and system 700; system 300 may be modified or configured to have and/or perform the functions described herein with respect to one or more of system 100 and system 700; and, system 700 may be modified or configured to have and/or perform the functions described herein with respect to one or more of system 100 and system 300.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 300, and/or system 700, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
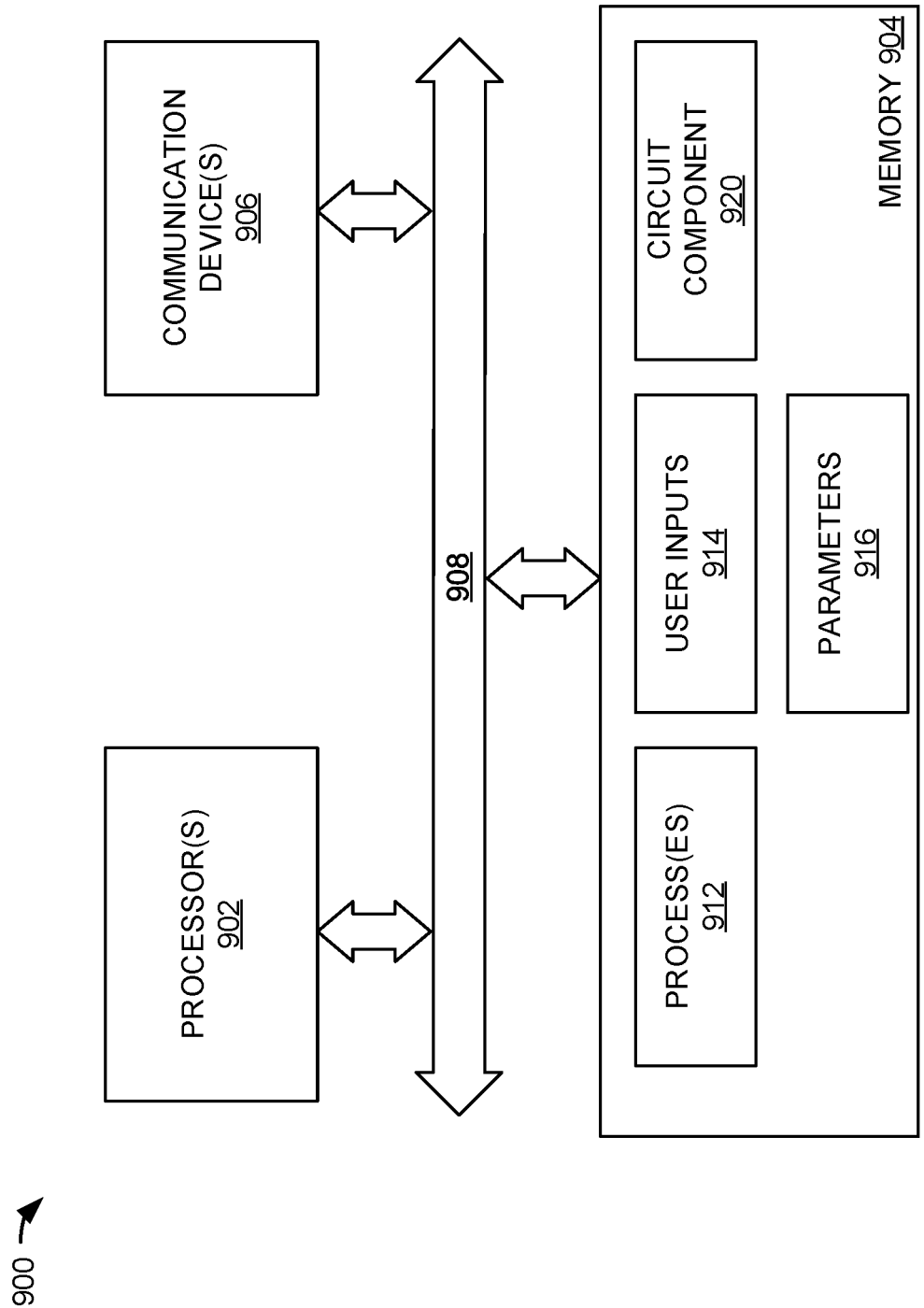
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of system 100, system 300, and/or system 700, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: A first memory allocation device, comprising: a first interface to receive, from a first processor that is local with respect to the first memory allocation device, a first request, the first request to be fulfilled by one of a first allocation of physical memory that is local with respect to the first processor and a second allocation of physical memory that is not local with respect to the first processor; a second interface to transmit, to a second memory allocation device that is not local with respect to the first processor, a second request, the second request to be for the second allocation of physical memory where the second allocation of physical memory is local with respect to the second memory allocation device, the second interface to receive, from the second memory allocation device, a system address to be used to access the second allocation of physical memory; and, first circuitry configured to associate the system address with a first physical address that is local with respect to the first processor concurrently with the second memory allocation device allocating a first block of physical memory corresponding to the second allocation of physical memory.

Example 2: The first memory allocation device of example 1, wherein the second memory allocation device is to complete allocating the first block of physical memory prior to receiving an access request, originating from the first processor, to the first block of physical memory.

Example 3: The first memory allocation device of example 1, further comprising: second circuitry configured to generate a third request to be transmitted via the second interface and to the second memory allocation device, the third request to be for a third allocation of physical memory that is local with respect to the second memory allocation device, the third request to be generated in anticipation of a fourth request, from the first processor, for a fourth allocation of physical memory.

Example 4: The first memory allocation device of example 3, wherein the second circuitry is further configured to generate a fifth request to be transmitted via the second interface and to a third memory allocation device, the fifth request to be for a fifth allocation of physical memory that is local with respect to the third memory allocation device, the fifth request to be generated in anticipation of a sixth request, from the first processor, for a sixth allocation of physical memory that is not local with respect to the first processor.

Example 5: The first memory allocation device of example 1, wherein the first interface is to also receive, from the first processor, a third request, the third request to be for a third allocation of physical memory that is local with respect to the first processor.

Example 6: The first memory allocation device of example 5, further comprising: second circuitry configured to, in response to the third request, associate a second physical address with the third allocation of physical memory.

Example 7: The first memory allocation device of example 1, wherein the first interface is also to receive, from the first processor, a third request, the third request to be to access the first allocation of physical memory, the first memory allocation device to satisfy the third request by accessing a third allocation of physical memory that is local with respect to the first processor.

Example 8: A first memory allocation device, comprising: a first interface to receive, from a second memory allocation device, a first request, the first memory allocation device being local with respect to a first processor, the second memory allocation device not being local with respect to the first memory allocation device, the first request to be for a first allocation of physical memory that is local with respect to the first memory allocation device and the first processor, the first interface to transmit, to the second memory allocation device, a system address to be used to access the first allocation of physical memory; and, first circuitry configured to allocate a first block of physical memory corresponding to the first allocation of physical memory concurrently with the second memory allocation device associating the system address with a first physical address that is local with respect to the first memory allocation device.

Example 9: The first memory allocation device of example 8, wherein the first memory allocation device is to complete allocating the first block of physical memory prior to receiving an access request, originating from a second processor that is local with respect to the second memory allocation device, to the first block of physical memory.

Example 10: The first memory allocation device of example 8, further comprising: second circuitry configured to generate a third request to be transmitted via the first interface and to the second memory allocation device, the third request to be for a third allocation of physical memory that is local with respect to the second memory allocation device, the third request to be generated in anticipation of a fourth request, from the first processor, for a fourth allocation of physical memory that is not local with respect to the first processor.

Example 11: The first memory allocation device of example 10, wherein the second circuitry is further configured to generate a fifth request to be transmitted via the first interface and to a third memory allocation device, the fifth request to be for a fifth allocation of physical memory that is local with respect to the third memory allocation device, the fifth request to be generated in anticipation of a sixth request, from the first processor, for a sixth allocation of physical memory that is not local with respect to the first processor.

Example 12: The first memory allocation device of example 8, wherein a second interface is to receive, from the first processor, a third request, the third request to be for a third allocation of physical memory that is local with respect to the first processor.

Example 13: The first memory allocation device of example 12, further comprising: second circuitry configured to, in response to the third request, associate a second physical address with the third allocation of physical memory.

Example 14: The first memory allocation device of example 8, further comprising: second circuitry configured to allocate a second block of physical memory in anticipation of receiving a second request, from a third memory allocation device, the third memory allocation device not being local with respect to the first processor, the second request to be for a second allocation of physical memory that is local with respect to the first memory allocation device and the first processor.

Example 15: A method of operating a first memory allocation device, comprising: receiving, via a first interface and from a first processor that is local with respect to the first memory allocation device, a first request, the first request to be fulfilled by one of a first allocation of memory that is local with respect to the first processor and a second allocation of memory that is not local with respect to the first processor; transmitting, via a second interface and to a second memory allocation device that is not local with respect to the first processor, a second request, the second request to be for the second allocation of memory where the second allocation of memory is to be local with respect to the second memory allocation device; receiving, via the second interface and from the second memory allocation device, a system address to be used to access the second allocation of memory; and, associating the system address with a first physical address that is local with respect to the first processor concurrently with the second memory allocation device allocating a first block of memory corresponding to the second allocation of memory.

Example 16: The method of example 15, wherein the second memory allocation device is to complete allocating the first block of memory prior to receiving an access request, originating from the first processor, to the first block of memory.

Example 17: The method of example 15, further comprising: generating a third request in anticipation of a fourth request, from the first processor, for a fourth allocation of memory that is not local with respect to the first processor, the third request to be for a third allocation of memory that is local with respect to the second memory allocation device; and, transmitting, via the second interface and to the second memory allocation device, the third request.

Example 18: The method of example 17, further comprising: generating a fifth request, the fifth request to be for a fifth allocation of memory that is local with respect to a third memory allocation device, the fifth request to be generated in anticipation of a sixth request, from the first processor, for a sixth allocation of memory that is not local with respect to the first processor; and, transmitting, via the second interface and to the third memory allocation device, the fifth request.

Example 19: The method of example 15, further comprising: receiving, via the first interface and from the first processor, a third request, the third request to be for a third allocation of memory that is local with respect to the first processor.

Example 20: The method of example 19, further comprising: in response to the third request, associating a second physical address with the third allocation of memory.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A first memory allocation device, comprising:
 a first interface to receive, from a first processor that is local with respect to the first memory allocation device, a first request, the first request to be fulfilled by one of a first allocation of physical memory that is local with respect to the first processor and a second allocation of physical memory that is not local with respect to the first processor;
a second interface to transmit, to a second memory allocation device that is not local with respect to the first processor, a second request, the second request to be for the second allocation of physical memory where the second allocation of physical memory is local with respect to the second memory allocation device, the second interface to receive, from the second memory allocation device, a system address to be used to access the second allocation of physical memory; and,
first circuitry configured to associate the system address with a first physical address that is local with respect to the first processor concurrently with the second memory allocation device allocating a first block of physical memory corresponding to the second allocation of physical memory.

2. The first memory allocation device of claim 1, wherein the second memory allocation device is to complete allocating the first block of physical memory prior to receiving an access request, originating from the first processor, to the first block of physical memory.

3. The first memory allocation device of claim 1, further comprising:
second circuitry configured to generate a third request to be transmitted via the second interface and to the second memory allocation device, the third request to be for a third allocation of physical memory that is local with respect to the second memory allocation device, the third request to be generated in anticipation of a fourth request, from the first processor, for a fourth allocation of physical memory.

4. The first memory allocation device of claim 3, wherein the second circuitry is further configured to generate a fifth request to be transmitted via the second interface and to a third memory allocation device, the fifth request to be for a fifth allocation of physical memory that is local with respect to the third memory allocation device, the fifth request to be generated in anticipation of a sixth request, from the first processor, for a sixth allocation of physical memory that is not local with respect to the first processor.

5. The first memory allocation device of claim 1, wherein the first interface is to also receive, from the first processor, a third request, the third request to be for a third allocation of physical memory that is local with respect to the first processor.

6. The first memory allocation device of claim 5, further comprising:
second circuitry configured to, in response to the third request, associate a second physical address with the third allocation of physical memory.

7. The first memory allocation device of claim 1, wherein the first interface is also to receive, from the first processor, a third request, the third request to be to access the first allocation of physical memory, the first memory allocation device to satisfy the third request by accessing a third allocation of physical memory that is local with respect to the first processor.

8. A first memory allocation device, comprising:
a first interface to receive, from a second memory allocation device, a first request, the first memory allocation device being local with respect to a first processor, the second memory allocation device not being local with respect to the first memory allocation device, the first request to be for a first allocation of physical memory that is local with respect to the first memory allocation device and the first processor, the first interface to transmit, to the second memory allocation device, a system address to be used to access the first allocation of physical memory; and,
first circuitry configured to allocate a first block of physical memory corresponding to the first allocation of physical memory concurrently with the second memory allocation device associating the system address with a first physical address that is local with respect to the first memory allocation device.

9. The first memory allocation device of claim 8, wherein the first memory allocation device is to complete allocating the first block of physical memory prior to receiving an access request, originating from a second processor that is local with respect to the second memory allocation device, to the first block of physical memory.

10. The first memory allocation device of claim 8, further comprising:
second circuitry configured to generate a third request to be transmitted via the first interface and to the second memory allocation device, the third request to be for a third allocation of physical memory that is local with respect to the second memory allocation device, the third request to be generated in anticipation of a fourth request, from the first processor, for a fourth allocation of physical memory that is not local with respect to the first processor.

11. The first memory allocation device of claim 10, wherein the second circuitry is further configured to generate a fifth request to be transmitted via the first interface and to a third memory allocation device, the fifth request to be for a fifth allocation of physical memory that is local with respect to the third memory allocation device, the fifth request to be generated in anticipation of a sixth request, from the first processor, for a sixth allocation of physical memory that is not local with respect to the first processor.

12. The first memory allocation device of claim 8, wherein a second interface is to receive, from the first processor, a third request, the third request to be for a third allocation of physical memory that is local with respect to the first processor.

13. The first memory allocation device of claim 12, further comprising:
second circuitry configured to, in response to the third request, associate a second physical address with the third allocation of physical memory.

14. The first memory allocation device of claim 8, further comprising:
second circuitry configured to allocate a second block of physical memory in anticipation of receiving a second request, from a third memory allocation device, the third memory allocation device not being local with respect to the first processor, the second request to be for a second allocation of physical memory that is local with respect to the first memory allocation device and the first processor.

15. A method of operating a first memory allocation device, comprising:
receiving, via a first interface and from a first processor that is local with respect to the first memory allocation device, a first request, the first request to be fulfilled by one of a first allocation of memory that is local with respect to the first processor and a second allocation of memory that is not local with respect to the first processor;
transmitting, via a second interface and to a second memory allocation device that is not local with respect to the first processor, a second request, the second request to be for the second allocation of memory where the second allocation of memory is to be local with respect to the second memory allocation device;

receiving, via the second interface and from the second memory allocation device, a system address to be used to access the second allocation of memory; and, associating the system address with a first physical address that is local with respect to the first processor concurrently with the second memory allocation device allocating a first block of memory corresponding to the second allocation of memory.

16. The method of claim 15, wherein the second memory allocation device is to complete allocating the first block of memory prior to receiving an access request, originating from the first processor, to the first block of memory.

17. The method of claim 15, further comprising:
generating a third request in anticipation of a fourth request, from the first processor, for a fourth allocation of memory that is not local with respect to the first processor, the third request to be for a third allocation of memory that is local with respect to the second memory allocation device; and, transmitting, via the second interface and to the second memory allocation device, the third request.

18. The method of claim 17, further comprising:
generating a fifth request, the fifth request to be for a fifth allocation of memory that is local with respect to a third memory allocation device, the fifth request to be generated in anticipation of a sixth request, from the first processor, for a sixth allocation of memory that is not local with respect to the first processor; and, transmitting, via the second interface and to the third memory allocation device, the fifth request.

19. The method of claim 15, further comprising:
receiving, via the first interface and from the first processor, a third request, the third request to be for a third allocation of memory that is local with respect to the first processor.

20. The method of claim 19, further comprising:
in response to the third request, associating a second physical address with the third allocation of memory.

* * * * *